Dec. 8, 1953
B. J. CHROMY ET AL
2,661,899
ELECTRONIC CALCULATOR
Filed July 12, 1946
7 Sheets-Sheet 1
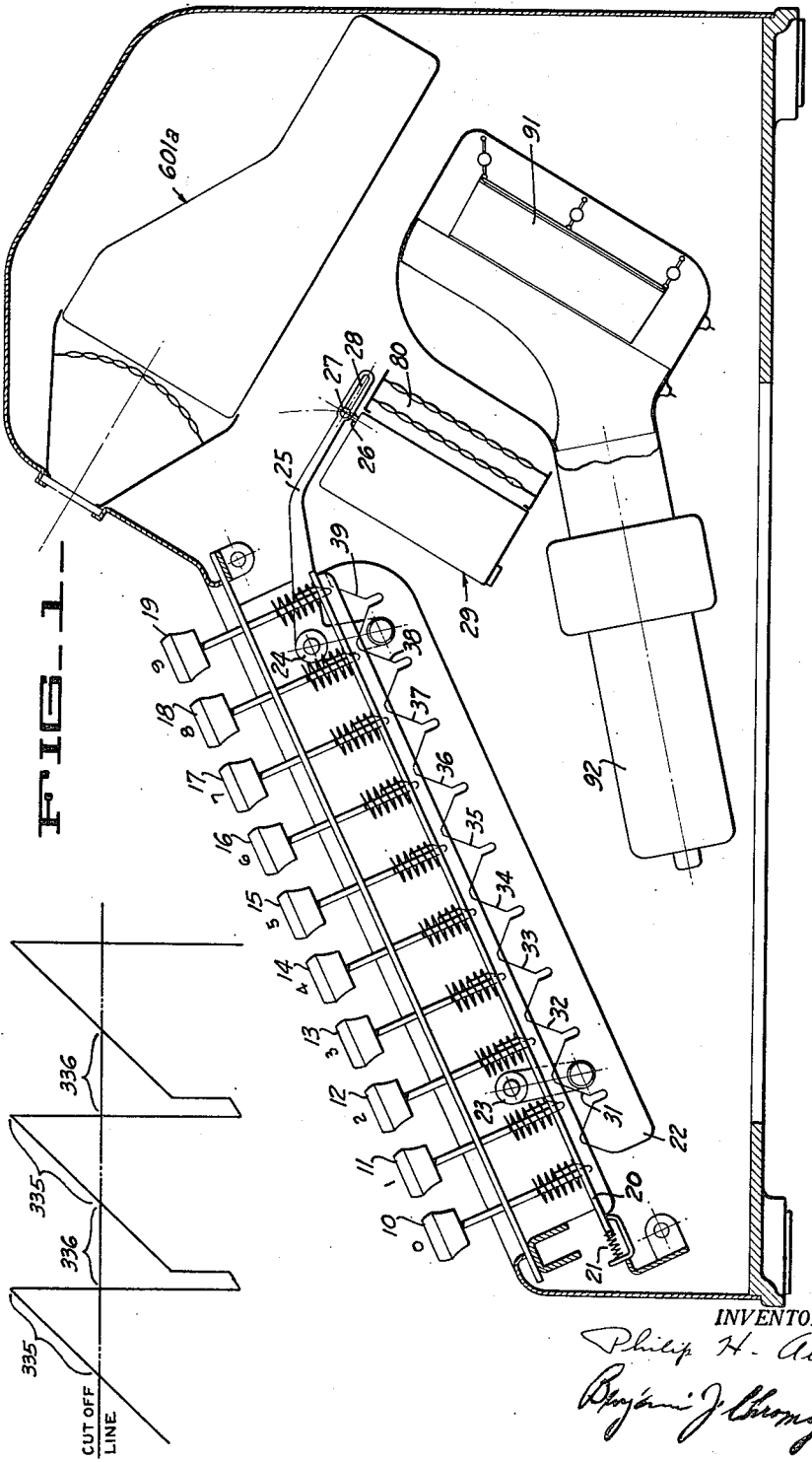
INVENTORS
Philip H. Allen
Benjamin J. Chromy Dec. 8, 1953  B. J. CHROMY ET AL  2,661,899
ELECTRONIC CALCULATOR
Filed July 12, 1946  7 Sheets-Sheet 2
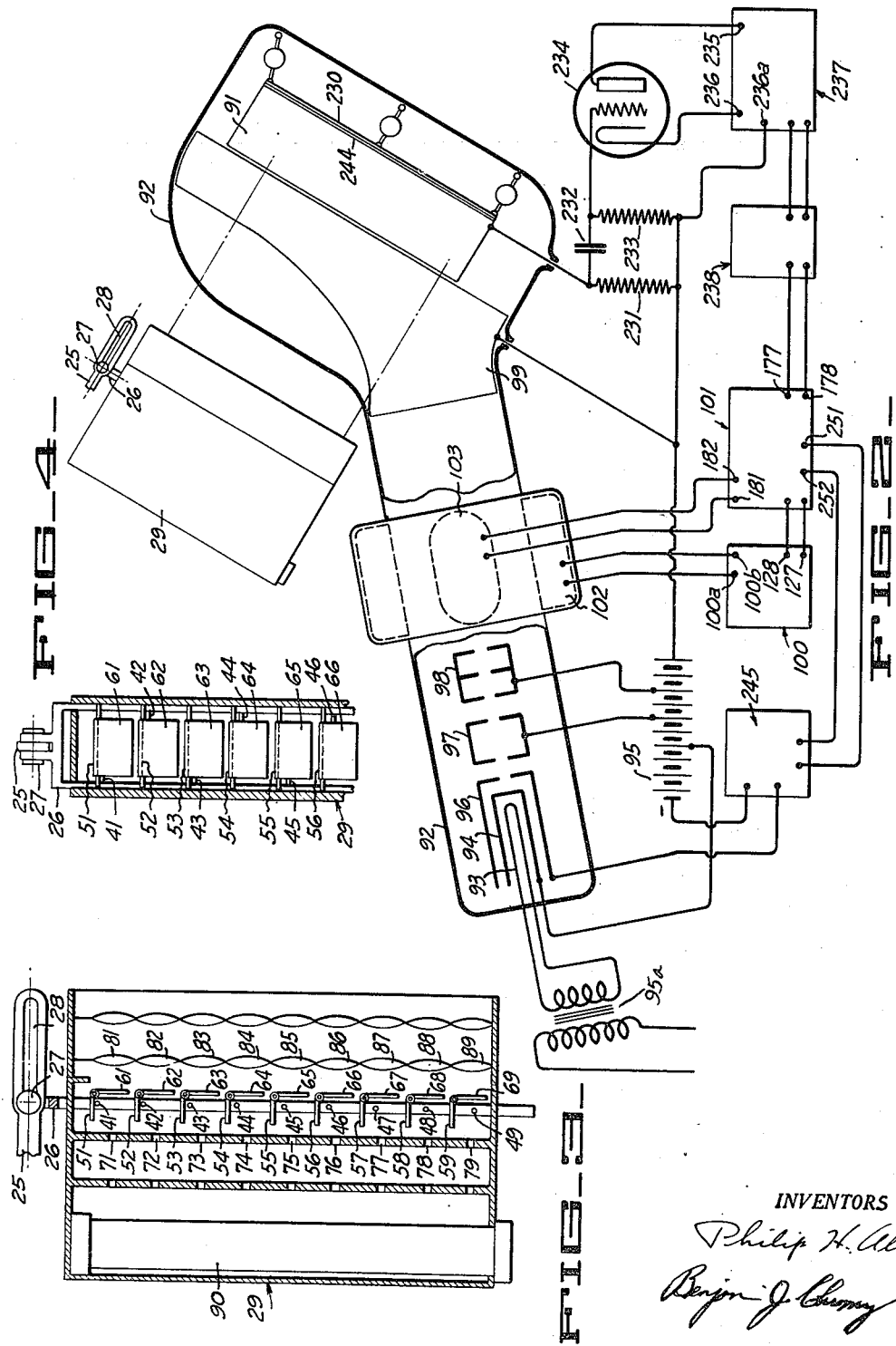
INVENTORS
Philip H. Allen
Benjamin J. Chromy

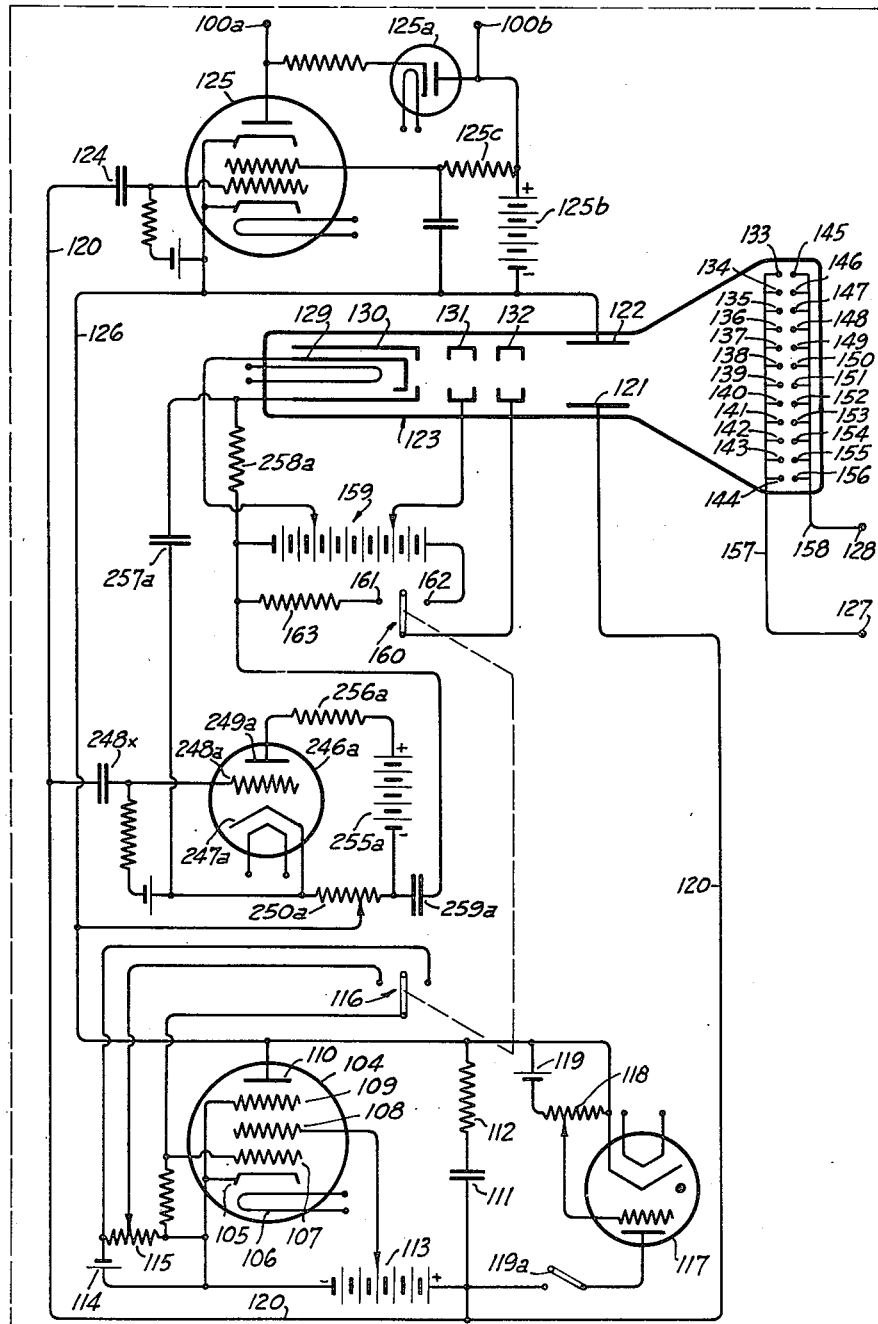
FIG_5_

Dec. 8, 1953   B. J. CHROMY ET AL   2,661,899
ELECTRONIC CALCULATOR
Filed July 12, 1946   7 Sheets-Sheet 4
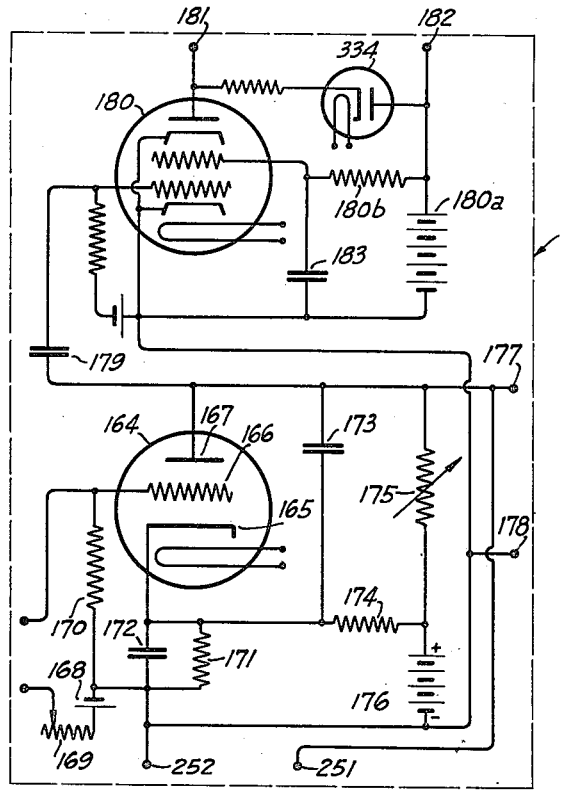
FIG_6_
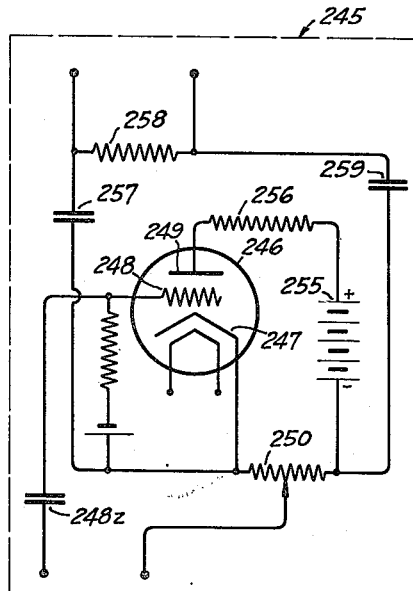
FIG_9_
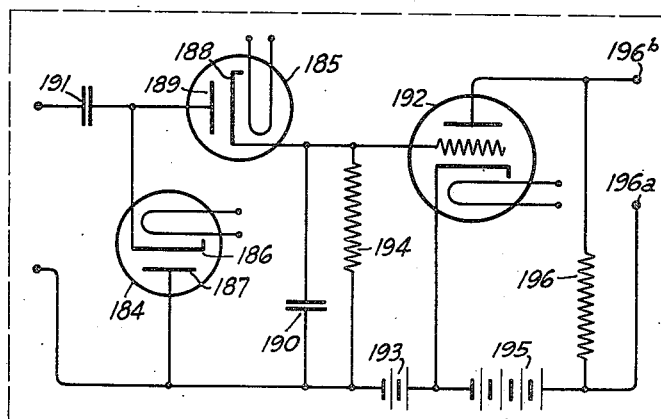
FIG_7_
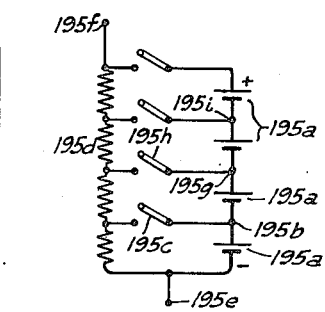
FIG_7A
INVENTORS
Philip H. Allen
Benjamin J. Chromy

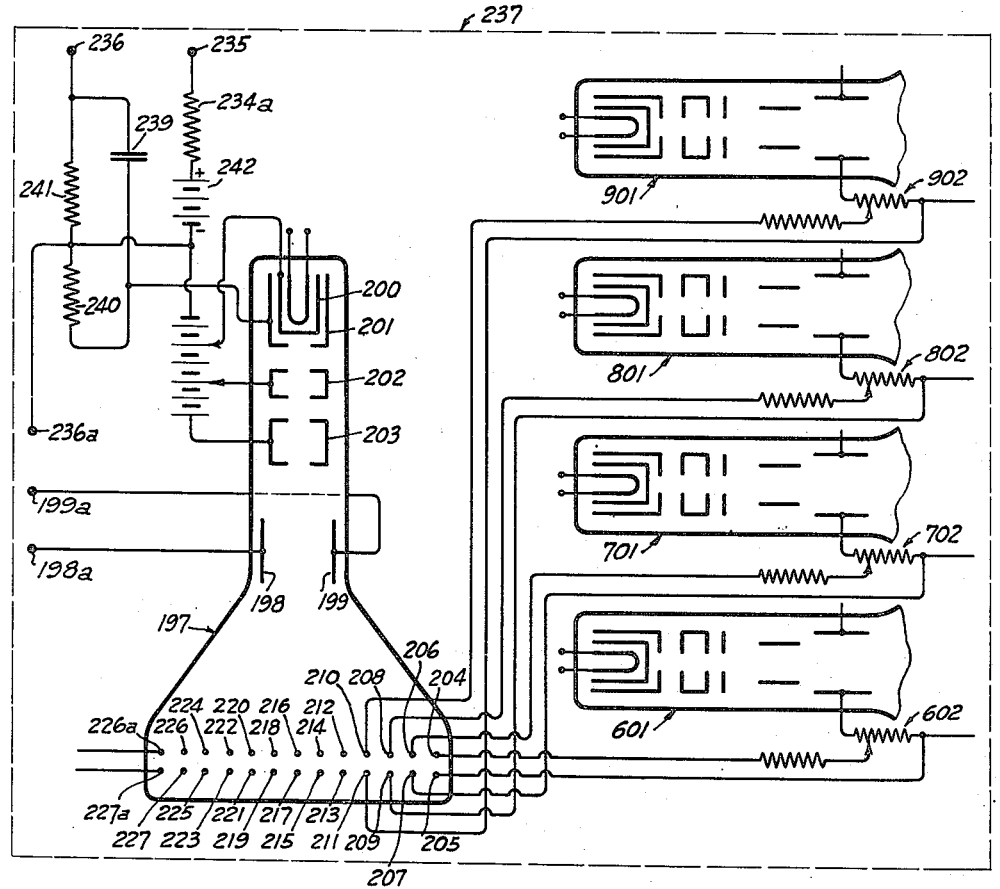
FIG_8_
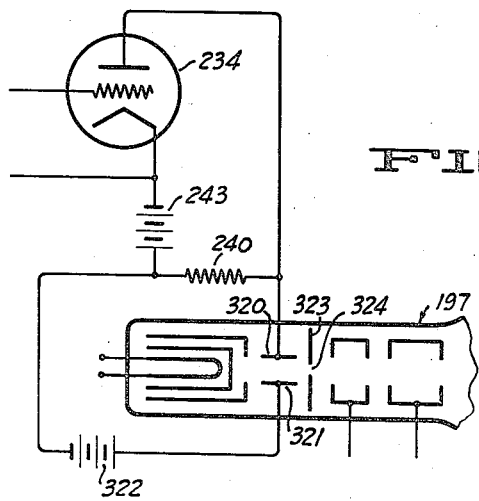
FIG_10_
INVENTORS
Philip H. Allen
Benjamin J. Chromy

Dec. 8, 1953     B. J. CHROMY ET AL     2,661,899
ELECTRONIC CALCULATOR
Filed July 12, 1946     7 Sheets-Sheet 6
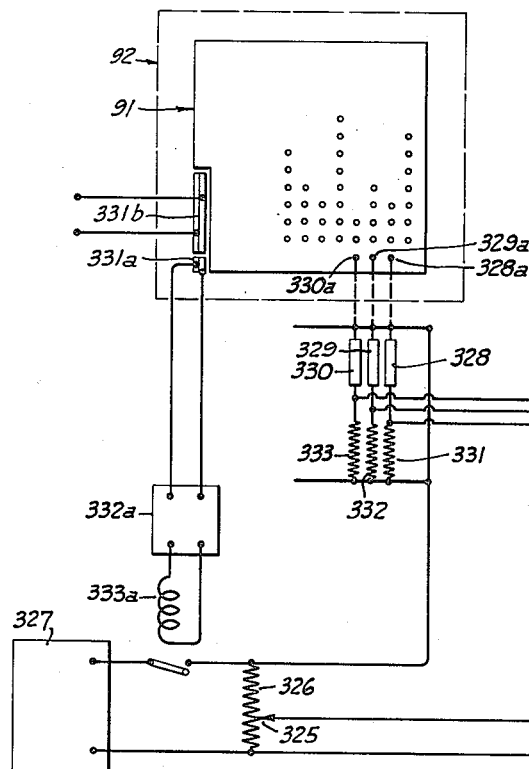
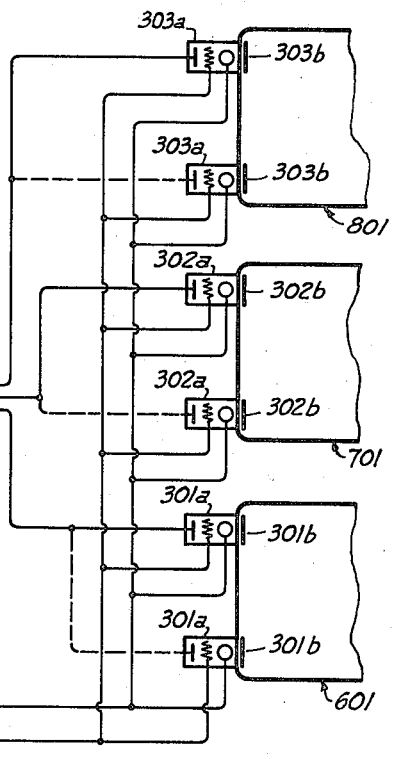
FIG_12_
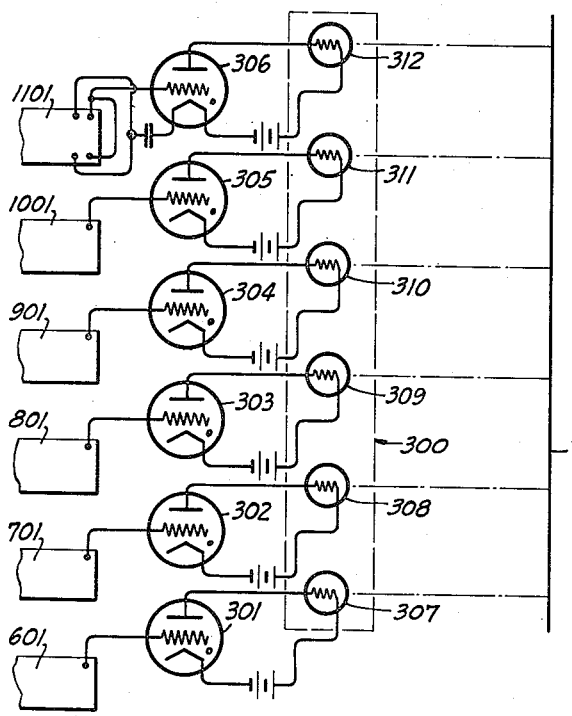
FIG_11_
INVENTORS
Philip H. Allen
Benjamin J. Chromy

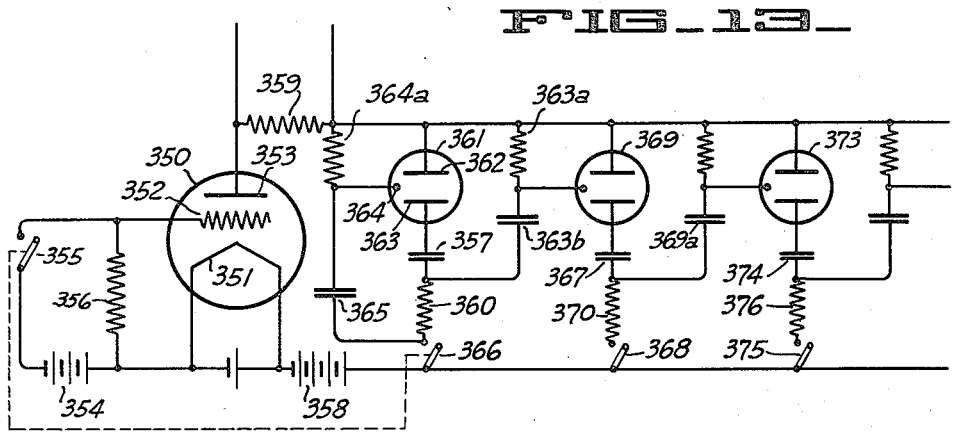
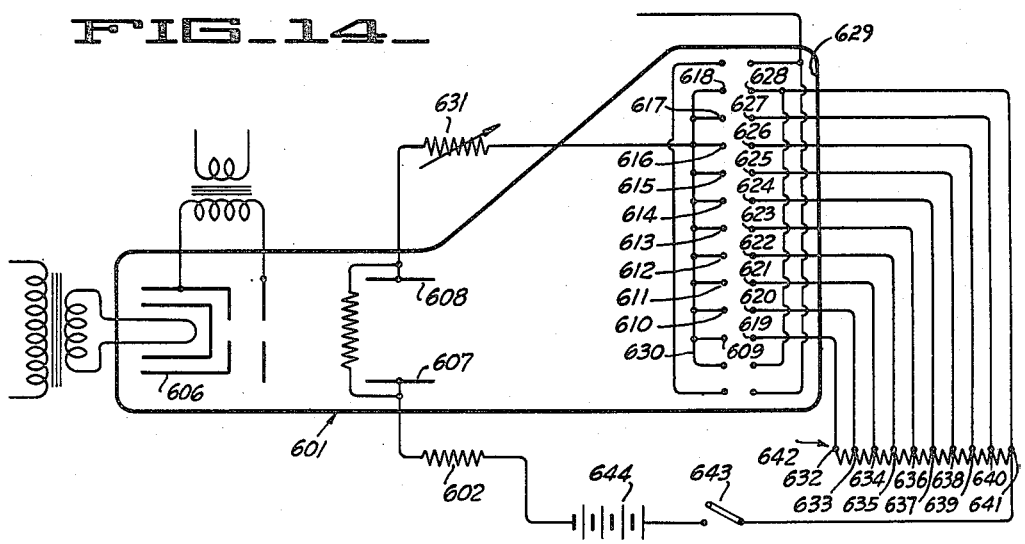
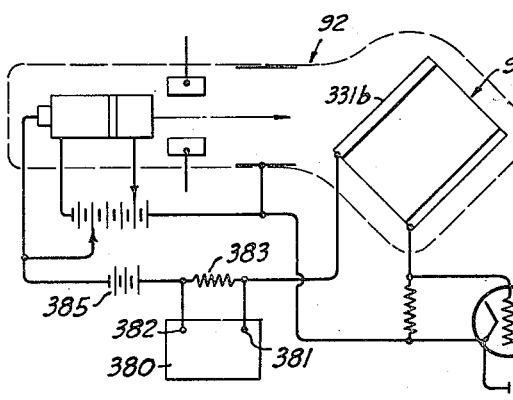
INVENTORS
Philip H. Allen
Benjamin J. Chromy

Patented Dec. 8, 1953

2,661,899

UNITED STATES PATENT OFFICE 2,661,899

ELECTRONIC CALCULATOR

Benjamin J. Chromy, Washington, D. C., and
Philip H. Allen, Orinda, Calif.

Application July 12, 1946, Serial No. 683,200

33 Claims. (Cl. 235—61)

This invention relates to registers in general. More particularly, this invention relates to registers employing electronic selection devices the operation of which is controlled from a main pulse generator.

An object of this invention is to provide a register including selection mechanism consisting of an electron tube having a target on which various numeral orders may be set or flashed.

Another object of this invention is to provide a register having an electron tube with a light sensitive target which may be scanned by an electron stream to provide electric pulses in the output circuit of the electron tube in accordance with the various ordinal numbers projected by light beams on the light sensitive target of the electron tube.

Still another object of this invention is to provide an electron tube having a target upon which light spots or indicia may be projected for scanning by an electron stream to produce electrical pulses in the output circuit of the electron tube in accordance with the light spots on the target and in accordance with the scanning of the target.

Another object of this invention is to provide a light sensitive electronic device adapted to produce electric pulses in the output thereof in accordance with values set into a keyboard associated with the electronic device, the aforesaid electric pulses being fed to an electronic switching device which is connected to a plurality of orders of register tubes.

Still another object of this invention is to provide an electronic register having a plurality of electron tubes in which streams of electrons are scanned over targets for generating electric pulses and for register switching, the electron streams of these electronic devices being controlled in their scanning operation from a central electric pulse generating apparatus.

A further object of the invention is to provide a register incorporating a light responsive selection mechanism providing an output representative of values represented by light indicia on the screen.

Still another object of the invention is to provide light sensitive selection mechanism to receive light indicia representing both digitation and transfer values and to provide an output corresponding to these values for entering a register.

A further object of the invention is to provide a light responsive selection mechanism including a screen upon which ordinal values can be represented for both digitation and tens transferring operations.

A further object of the invention is to provide selection mechanism in the form of a cathode ray tube incorporating a light responsive screen upon which ordinal values can be displayed for both tens transfer and for digitation and also incorporating means for operating the counter which records the cycles of operation of the machine.

Other objects of the invention will be apparent from certain preferred embodiments of the invention.

Referring to the drawings briefly,

Figure 1 is a sectional elevational view of a calculating machine embodying this invention.

Figure 2 is a fragmentary sectional view of the cathode ray scanning device and electrical circuits associated therewith employed in accordance with this invention.

Figure 3 is a detail sectional view of the light control and optical apparatus for projecting light spots upon the screen of the cathode ray scanning device.

Figure 4 is a fragmentary sectional view of the shutter devices employed in the light control apparatus shown in Figure 3.

Figure 5 is a schematic wiring diagram of the saw-tooth wave generators connected to the cathode ray beam deflecting devices of the cathode ray scanning apparatus.

Figure 6 is a schematic wiring diagram of a portion of the register apparatus and associated circuit.

Figure 6a is a diagram illustrating the character of the scanning pulses employed with the circuit of Figure 6.

Figure 7 is a schematic wiring diagram of the step-by-step counting circuit.

Figure 7a is a schematic wiring diagram of the means for varying or shifting the ordinal position of entry of digits into the accumulator.

Figure 8 is a schematic wiring diagram of the circuit providing for ordinal entry of the respective series of ordinal pulses obtained from the selection mechanism.

Figure 9 is a schematic wiring diagram of the blanking circuit for the cathode ray of the selection tube.

Figure 10 is a schematic wiring diagram of a modified form of control for the switching tube.

Figure 11 is a schematic wiring diagram of a modified form of tens transfer circuit.

Figure 12 is a schematic wiring diagram of still another modified form of tens transfer circuit.

Figure 13 illustrates a pulse generating circuit for generating a plurality of pulses in sequence.

Figure 14 is a schematic diagram of a cathode ray accumulator or register tube; and Figure 15 is a schematic illustration of a counting device in the nature of a revolutions counter as applied to this apparatus.

General description

The present invention is concerned generally with providing a selective pulse generator as the plural order selection mechanism of a register, such as a calculating device, for example, in which the various values to be entered into the register or accumulator may be represented in the form of an ordinal array of light indicia, such as light dots, on the light-responsive screen of a cathode ray tube. Associated with the cathode ray tube is a scanning circuit adapted to produce a step-by-step scanning of the ordinal array of light indicia on the screen and at the same time to control a sweeping circuit whereby the pulses resulting from scanning of the respective ordinal arrays of light indicia will be introduced successively into the various orders of the electrical registering devices or tubes.

Also the invention contemplates the exercise of a tens transfer control from the registering tubes of the accumulator to place additional light indicia on the screen in the correct ordinal positions to represent tens transfer increments which will be scanned with the other ordinal lighting indicia of the same order representing the digitation values of this order. Further, the scanning of the screen is utilized to provide a counting pulse so that the cycles of the operation can be counted and entered into a counter register in the appropriate ordinal positions.

Selection mechanism

*Keyboard and optical selecting system.*—Referring to Figure 1 of the drawing in detail, reference numerals 10, 11, 12, 13, 14, 15, 16, 17, 18 and 19 designate a row of values keys "0" to "9," respectively, of the first order of this apparatus. The value keys 10 to 19 are of conventional construction and each has associated therewith a compression spring for maintaining the key in its raised or uppermost position. Also associated with the row of keys is a latching slide 20 of conventional construction which is provided with a spring 21 by which it is urged to active position. The latch slide 20 is adapted to cooperate with the keys in the usual manner to hold a depressed key in its depressed position until it is released by the depression of a subsequent key.

Associated with each ordinal row of value keys is a selection or cam slide 22 of conventional construction which is supported by pivoting links 23 and 24 directly beneath the lower ends of the key stems 11 to 19, inclusive, and this cam slide 22 is provided with cam surfaces 31 to 39, inclusive, portions of these surfaces being adapted to be engaged by the key stems 10 to 19, inclusive, respectively, whereby the member 22 may be moved endwise differential distances by the different keys 11 to 19, inclusive.

A lever 25 is attached to the pivoted member 24 to form a bell crank which is part of the mechanical linkage between the selection slide 22 and a shutter manipulating plunger 26 that is pivotally attached to the lever 25 by a pin 27 engaging a slot 28 of the lever 25. The plunger 26, shown in greater detail in Figures 3 and 4, is U-shaped member slidably mounted in the housing 29 so that this plunger may be moved upward through small incremental distances as the lever 25 is moved upward. As the lever 25 is moved upward, the plunger 26 is moved in linear fashion in the apertures of the housing 29 provided therefor. The plunger 26 is provided with a plurality of differentially spaced pins 41 to 49, inclusive, for engaging levers 51 to 59, inclusive, respectively, of the shutters 61 to 69, inclusive, respectively. The shutters 61 to 69, inclusive, are associated with aperture systems 71 to 79, inclusive, respectively and with lens systems 81 to 89, inclusive, form light collimating systems for passing small beams of light from the light source 90 and when the shutters 61 to 69, inclusive, are closed these beams of light impinge upon light absorbing surfaces of carbon or the like, provided to these shutters. However, when the number "9" key 19 is in depressed position and the lever 25 of the bell crank is in its uppermost position so that the shutters 61 to 69, inclusive, are open light beams collimated through all of the aperture systems 71 to 79, inclusive, pass substantially unobstructed through the lens systems 81 to 89, inclusive, respectively, and are focused upon the light sensitive or cathode mosaic 91 of the cathode ray beam device 92. As a result, nine light spots will appear upon the screen 91 of the device 92. However, if only the "one" key 11 of the keys 10 to 19, inclusive, is depressed, only the shutter 61 is opened because of the cam device 22 is moved only a small distance in its lateral movement and the lever 25 of the bell crank moves the plunger 26 only far enough so that the pin 41 deflects the shutter 61 out of the path of the light beam passing through the aperture system 71. At the same time and because of the differential spacing of the pins 41 to 49, inclusive, the one-step movement of the slide to open the shutter 61 has moved the pin 42 on the plunger 26 into engagement with the lever 52. Correspondingly, additional increments of movement of the selection slide 22 upon depression of the higher value keys will cause additional ones of the series of pins 41 to 49 to become effective and to correspondingly open additional ones of the shutters 61 to 69. In this way, a corresponding number of light rays can be enabled in each order of the selection mechanism in accordance with the value of the depressed value key 11 to 19. This selective control of the light beams is enabled because the lever 25 moves through progressively increasing angles depending upon which of the keys 11 to 19, inclusive, respectively, are depressed. It will be observed that the pins 41 to 49, inclusive, of the plunger 26 are spaced by different distances from that by which the levers 51 to 59, inclusive, of the shutters 61 to 69, inclusive, respectively, are spaced. Consequently, the pin 41 engages the lever 51 before the pin 42 engages the lever 52, and the pin 42 engages the lever 52 before the pin 43 engages the lever 53, and so on, until the pin 49, being the last of the series of pins, engages the lever 59 after all of the other pins have engaged and lifted their respective levers. Consequently, the shutters 61 to 69, inclusive, may be deflected out of the path of the associated light beams in series, the shutter 61 being deflected first, shutter 62 being deflected second, while the shutter 61 is held open, the shutter 63 being deflected third, while the shutters 61 and 62 are held open and the shutter 64 being deflected fourth while the shutters 61, 62 and 63 are held open, and so on, until the shutter 69 is deflected while the shutters 61 to 68, inclusive, are held open.

A plurality of rows of keys, such as keys 10 to 19, inclusive, are provided and each of these rows is associated with a cam slide, such as 22, a crank, such as 25, and a shutter operating plunger, such as 26, so that each row of keys may be operated to control from one to nine light beams through a shutter system, such as, shutters 61 to 69, inclusive, aperture system, such as 71 to 79, inclusive, and lens system, such as 81 to 89, inclusive. Each row of aperture systems, such as 71 to 79, inclusive, is provided with an elongated light source, such as 90, which may be an elongated incandescent type lamp, or a fluorescent type lamp, or an ionized gas tubular lamp.

The lens systems 81 to 89, inclusive, consist of a plurality of lenses and these may be made of such material as "lucite," which may be formed by suitable dies. Where a plurality of rows of apertures, such as 71 to 79, inclusive, are positioned side by side so that a plurality of lens systems, such as 81 to 89, inclusive, are positioned side by side, all of the lens system elements lying in the same plane may be formed together by a single set of dies so that the lens systems form unitary self-supporting structures of a wall-like configuration, the edges of which engage the interior walls of the housing 29. The interior of the housing 29 may be coated with black, light-absorbing substantially non-reflecting coating, such as carbon, or "Aquadag" to minimize reflections in the interior of the housing.

From the above description it is seen that in response to selective depression of the different orders of the keys of the different orders of the keyboard, a plural digit factor may be entered into the machine and through the optical system associated with the housing 29 will be displayed on the light responsive screen 91 in the form of an ordinal series of incremental light indicia or dots corresponding in value to the values of the depressed keys of the keyboard.

*Selection tube.*—As previously stated the cathode ray device 92 including the screen 91 is adapted to scan the light indicia on the screen and to transmit pulses from the output thereof which will be representative of these ordinal values. This scanning is controlled in cyclic fashion and there are respective vertical scanning sweeps for the successive ordinal positions on the screen while one transverse cyclic sweep is taking place.

The cathode ray device 92 may consist of a device, such as the "Iconoscope" or it may consist of a Farnsworth disector tube, or a photo-conductive pick-up tube, such as are described in the book "Television" by Zworykin and Morton, published by John Wiley and Sons, Inc. This tube is provided with a glass envelope having a filament 93 connected to a source of current supply, such as transformer 95a, and provided for the purpose of heating the electron emitting cathode 94. The cathode 94 is connected to an intermediate point on the battery 95 and the negative terminal of this battery is connected through the blanking apparatus 245 to the control electrode 96 which is provided with a small aperture in front of the cathode 94 for the purpose of defining the stream of electrons projected from the cathode 94. The first anode 97 is connected to a terminal of the battery 95 which is positive with respect to the cathode connection of the battery; the second anode 98 is connected to a terminal of the battery 95 that is positive with respect to the first anode 97 and the third anode 99 is connected to the positive terminal of the battery 95 so that the third anode 99 is positive with respect to the second anode 98 and the first anode 97.

The heater filament 93, cathode 94, control electrode 96, first anode 97 and second anode 98 comprise the electron gun of the cathode ray device 92 and this electron gun provides the cathode ray beam or electron beam that is used to scan the cathode mosaic screen 91 upon which the light beams from the light collimating, control and focusing devices in the housing 29 are projected to form light spots. It is apparent that while a rather elaborate type of cathode ray device 92 is illustrated, a much simpler device may be employed in this invention inasmuch as the high definition such as is required in television is not required in the present invention. Consequently, a much simpler electron gun than that illustrated may be employed.

*Scanning pulse generator.*—Referring to Figures 5 and 6 in detail, there are illustrated the circuit connections of the saw tooth current generators which are shown in block form and designated by reference numerals 100 and 101 in Figure 2. The saw tooth generator 100 is connected to the electromagnetic deflecting coil 102 of the electron beam device 92 to provide a cyclic transverse sweep of the beam and the saw tooth generator 101 is connected to the electromagnetic deflector 103 of this device to provide a plurality of ordinal vertical sweeps of the beam during the cyclic sweep. It is, of course, obvious that electrostatic deflection of the electron beam of the device 92 generated by the electron gun thereof, may be used for moving this beam over the screen 91 instead of the electromagnetic deflection apparatus illustrated.

In the circuit arrangement shown in Figure 5 there is provided a thermionic electric discharge device 104 of the pentode type having a cathode 105; cathode heater 106, a control grid 107, a screen grid 108, a suppressor grid 109 and an anode 110, and this device 104 is employed for the purpose of charging the capacitor 111 through the resistor 112 from the source of current supply 113. A source of grid bias potential 114 shunted by the potentiometer 115 and having one terminal thereof connected to the cathode 105 is employed for controlling the charging of the capacitor 111 through the tube 104. For this purpose the single pole double throw switch 116 having the blade thereof connected to the grid 107 and the two contactors thereof, one connected to a terminal of the bias potential source 114 and the other connected to the variable contact of the potentiometer 115, is employed and the operation thereof will be described in detail hereinafter.

A thyratron 117 (Figure 5) is employed for discharging the capacitor 111 and for this purpose the anode of this thyratron is connected to the positive terminal of the source 113 and the associated terminal of the capacitor 111. The cathode of the thyratron 117 is connected to one terminal of the resistor of the potentiometer 118, one terminal of the source of grid bias potential 119, one terminal of the resistor 112 and the anode 110 of the tube 104. The other terminal of the resistor of the potentiometer 118 is connected to the negative terminal of the source of bias potential 119 and the variable contactor of the potentiometer 118 is connected to the grid electrode of the thyratron 117. The anode of the thyratron 117 and associated terminal of the capacitor 111 and battery 113 are connected through the conductor 120 to the deflector electrode 121 of the electron beam switching device 123 and to the capacitor 124 associated with the control grid of the thermionic device 125. The cathode of the thyratron 117 and anode 119 of tube 104 are connected through the wire 126 to the other deflector 122 of the electron beam device 123 and to the cathode of the tube 125.

The purpose of the electron beam device 123 (Figure 5) is to provide a definite number of pulses in the output circuit 127—128 thereof for each electrical pulse of saw tooth wave form applied to the deflectors 121—122 thereof. This electron beam device 123 is in general similar to the device 92 shown in Figure 2 in that it is provided with an electron gun consisting of a cathode 129, a control electrode 130, and an anode 131. Another electrode 132 which may be used either as an anode or as a quenching electrode as will be described in greater detail hereinafter, is also provided in the electron gun of the tube 123. The target of the tube 123 consists of a plurality of contacts 133 to 144, inclusive, connected to the busbar 157 and another similar set of contacts 145 to 156, inclusive, connected to the busbar 158, the busbar 157 being connected to the output wire 128. These contacts 133 to 144, inclusive and 145 to 156, inclusive, are associated in pairs, that is, contacts 133—145 comprise one pair, contacts 134—146 comprise another pair, 135—147 comprise a third pair, contacts 136—148 comprise a fourth pair, 137—149 comprise a fifth pair, 138—150 comprise a sixth pair, 139—151 comprise a seventh pair, 140—152 comprise an eighth pair, 141—153 comprise a ninth pair, 142—154 comprise a tenth pair, 143—155 comprise an eleventh pair, and 144—156 comprise a twelfth pair, so that as the beam is swept over these contacts, as will be described in detail, twelve pulses for each sweeping of the beam thereover will be applied to the output circuit 127—128.

Simultaneously as a saw tooth shaped potential impulse is applied to the deflector electrodes 121—122 of the electron beam device 123 the same potential pulse is applied to the input circuit of the thermionic device 125 since the conductors 120 and 126 are connected to the input circuit of this thermionic device. The purpose of the device 125 is to alter the shape of the saw tooth potential pulse produced by the charging of the capacitor 111 through the tube 104 before this potential pulse is applied to the electromagnetic deflector coil 102 of the device 92. If electrostatic deflection is used in the device 92 instead of the electromagnetic deflection illustrated the thermionic device 125 may be dispensed with and the electrostatic deflectors of the device 92 employed for moving the beam laterally may be connected directly to the conductors 120—126 to the output of the tube 104. In other words, the thermionic device 125 is a current amplifier functioning to produce a saw tooth current wave for a circuit consisting of inductance and resistance in series.

The electron beam apparatus 123 is provided with a source of current supply 159 for energizing the electron gun thereof and for controlling the operation of the device. A single pole double throw switch 160 which is mechanically coupled to the switch 116 but electrically insulated therefrom, is employed with the blade thereof connected to the electron gun electrode 132 and with the terminals 161 and 162 connected to the resistor 163 and the positive terminal of the source of current supply 159, respectively. The other terminal of the high resistance 163 is connected to the negative terminal of the source of current supply 159 which is also connected to the control electrode 130 of the electron gun through the blanking resistor 258a. Thus, when the blade 160 of the switch contacts the terminal 162 the gun electrode 132 is connected as an additional anode and functions to focus the beam of the electron gun upon the contacts of the target. However, when the switch blade 160 contacts the terminal 161 the electrode 132 is used as a beam quenching or blanking electrode.

The output conductors 127—128 are employed to connect the apparatus 100 to the apparatus 101 shown in Figure 6 so that the latter apparatus may be triggered or pulsed by the tube 123 shown in Figure 5 to generate the vertical ordinal scanning pulses for the deflector coil 103 of tube 92. The apparatus 101 consists of a vacuum tube 164 having a cathode 165, grid electrode 166 and an anode 167. A grid resistor 170 is connected between the grid 166 and the lower terminals of the cathode resistor 171 and cathode capacitor 172 to bias the tube 164 to cut off during the charging of the capacitor 173. One terminal of resistor 169 is connected to the positive terminal of the source of bias potential 168 and the variable contactor of this resistor 169 is connected to the wire 127. The negative terminal of the source of bias potential 168 is connected to the lower terminals of the cathode resistor 171 and cathode capacitor 172 and the upper terminals of these devices 171—172 are connected to the cathode 165 and to the capacitor 173 and resistor 174. The other terminal of the capacitor 173 is connected to the anode 167 and to the top terminal of the variable resistor 175 as well as the output terminal 177 and capacitor 179. The negative terminal of the source of current supply 176 is connected to the cathode resistor 171 and to the output terminal 178 and the positive terminal of this source of current supply is connected to the resistors 174 and 175.

The anode 167 of the vacuum tube 164 is coupled through the capacitor 179 to the control grid of the current amplifier tube 180 and the cathode of this current amplifier is connected to the negative terminal of the source of current supply 176 and to the lower terminals of the cathode resistor 171 and cathode capacitor 172. The purpose of this current amplifier 180 is substantially the same as that of the current amplifier 125 as described above. The anode of the current amplifier 180 is connected to the output terminal 181 and through this to one of the terminals of the electromagnetic deflector coil 103 of the electron beam device 92. The cathode of the current amplifier 180 is connected to the output terminal 182 through anode battery 180a. The screen grid of the current amplifier 180 is coupled to the cathode by the capacitor 183 and the positive terminal of the battery 180a is connected to the screen grid by the resistor 180b. The output terminal 182 is connected to the other terminal of the electromagnetic deflector coil 103 of the electron beam device 92.

The terminals 177 and 178 of the apparatus 101 are connected to the step by step counting circuit 238 shown in Figure 7 consisting of the diode rectifier tubes 184 and 185 and the capacitor 190. Each of the diode rectifier tubes 184 and 185 is provided with a cathode and an anode, the diode 184 having a cathode 186 and an anode 187 and the diode 185 having a cathode 188 and an anode 189. The anode 189 of the diode 185 is connected to the cathode 186 of the diode 184 and to one terminal of the coupling capacitor 191, the other terminal of this coupling capacitor being connected to the terminal 177. The cathode of the diode 185 is connected to the upper terminal of the capacitor 190 and to the grid of the triode 192. The anode 187 of the diode 184 is connected to the terminal 178 and to the lower terminal of the capacitor 190 and also to the negative terminal of the battery 193. The negative terminal of the battery 193 is also connected to a high resistance grid resistor 194 to apply a negative bias to the grid of the triode 192 whereby this tube 192 is biased nearly to cutoff since the positive terminal of the battery 193 is connected to the cathode of the tube 192. The anode of the tube 192 is connected to one terminal of the resistor 196 and to the deflector electrode 199 of the electron beam switching tube 197. The other terminal of the resistor 196 is connected to the other deflector electrode 198 of the tube 197 and to the positive terminal of the battery 195, the negative terminal of this battery being connected to the cathode of the tube 192. The tube 192 is of the remote cutoff type having a grid voltage plate current characteristic of a substantially exponential shape. The reason for using a tube 192 of these characteristics is to compensate for the non-linear charging of the capacitor 190. The capacitor 190 is charged in steps that decrease in size exponentially as the voltage across this capacitor approaches the final value and the characteristic of the tube 192 is such as to compensate for this exponential decrease in size and produces in the output circuit thereof across the resistor 196 voltage steps of substantially equal size.

The blanking apparatus 245 is also shown in detail in Figure 9 and consists of an amplifier 246 having a cathode 247, a grid 248 and an anode 249. The grid 248 of the amplifier 246 is coupled by capacitor 248x to the terminal 251 of the saw tooth generator apparatus 101 and the cathode 247 is connected to a terminal of the cathode follower resistor 250 and to a terminal 252 of the apparatus 101. These terminals 251 and 252 are connected to the output terminals of the saw tooth generator 101 as shown and in this manner function to supply the input of the amplifier 246 with saw tooth-shaped electrical impulses, such as are supplied to the current amplifier 180 for sweeping the beam of the electron beam tube 92 vertically over the mosaic cathode 91. A source of anode current supply 255 having the positive terminal connected to the anode resistor 256 and the negative terminal connected to the cathode follower resistor 250 so that the anode current of the amplifier 246 flows through the cathode follower resistor 250. The cathode of this amplifier 246 is connected to a capacitor 257 and the other side of the capacitor is connected to the control electrode 96 of the tube 92 and to the resistor 258. The other end of the resistor 258 is connected to the negative terminal of the battery 95 so that the potential between the electrode 96 and the cathode 94 is applied from the battery 95 through the resistor 258. The negative terminal of the cathode follower resistor 250 is coupled to the negative terminal of the battery 95 and the corresponding terminal of the resistor 258 by the capacitor 259. It will therefore be observed that the potential across the cathode follower resistor 250 corresponding to the saw tooth shaped pulses derived from the apparatus 101 is applied to the control grid 96 of the electron beam device 92 through a differentiating circuit consisting of the capacitor 257 and the resistor 258 and this differentiating circuit functions to blank the electron beam of the cathode ray device 92 during the abrupt downward or return stroke of the electron beam of this device. For this purpose, this differentiating circuit is adjusted so that the voltage between the cathode 94 and the control grid 96 of the tube 92 is relatively constant while the beam of the device 92 is being scanned upward across the cathode mosaic 91. However, when the beam of this tube 92 reaches the top of the mosaic 91 the saw tooth pulse collapses relatively rapidly and as a result the potential on the control grid 96 is further decreased, that is, this control grid 96 is made more negative with respect to the cathode 94 and the beam of the tube 92 is momentarily cut off until the next saw tooth pulse is supplied by the apparatus 101 at which time the beam of the tube 92 is restored and started on its next upward scan.

A similar blanking circuit is provided to the impulse producing tube 123 shown in Figure 5 and this consists of the triode 246a having cathode 247a, grid 248a and anode 249a. The triode 246a is supplied with saw tooth pulses through capacitor 248x from the output circuit of the pentode 104. The triode 246a is supplied with plate current from the battery 255a through the anode or plate resistor 256a and cathode follower resistor 250a and the cathode follower resistor is coupled across the blanking resistor 258a by capacitors 257a and 259a so that the beam of the tube 123 is blanked out during the return trace thereof after it has swept over the target electrodes 133—156 to produce 12 pulses in the output circuit 127—128. When the beam of the tube 123 is re-established it is in position to begin another cycle, i. e., to produce 12 more pulses.

However, the beam of the tube 92 need not be blanked out through use of a circuit such as circuit 245 (Figure 9) since the resistor-capacitor circuit consisting of the capacitor 232 and the resistor 233 connected to the output of the tube 92 may be tuned or adjusted to respond to the time rate of the voltage pulse produced by the tube 92 during the upward or useful scan of the mosaic 91 by the electron beam. If the filter consisting of the capacitor 232 and resistor 233 is adjusted to the time rate of the aforesaid upward scan of the mosaic by the electron beam then this filter will reject the voltage pulses produced by the back swing or abrupt scan of the mosaic. The filter may be adjusted to electrical pulses of different frequencies and it may consist of different combinations of capacity, resistance and/or inductance. Furthermore it may be connected on the output of the amplifier 234 if desired and in that case the filter would obviously be provided in addition to the resistor 233 and capacitor 232 since these normally function as coupling capacity and grid resistor.

*Switching tube.*—As previously explained, the respective ordinal pulses generated by the cathode ray device 92 are entered successively in the register tube in the desired ordinal relation from the lowest through the highest of these tubes which are selected to be active. For this purpose, an electron beam switching tube is provided which operates during each cyclic scanning sweep to connect successively the output of the cathode ray device 92 to the respective input circuits of the register tubes. The ordinal position of entry of the various digits or digit pulses may be varied or controlled for multiplying or dividing operation.

The electron beam switching tube 197 (Figure 8) is provided with a cathode 200 which is indirectly heated, a control electrode 201, a first anode 202 and a second anode 203. These electrodes comprise the electron gun which projects a beam of electrons between the deflector electrodes 198 and 199 to the target electrodes 204 to 227, inclusive. These target electrodes are arranged in pairs 204—205, 206—207, 208—209, 210—211, 212—213, 214—215, 216—217, 218—219, 220—221, 222—223, 224—225, and 226—227, and these pairs of target electrodes are connected to the pulse inserting resistors of the register tubes. For example, electrodes 204—205 are connected to the pulse inserting resistor 602 of the main deflector circuit of the "units" register tube 601, target electrodes 206—207 are connected to the pulse inserting resistor 702 of the "tens" register tube 701, target electrodes 208—209 are connected to the pulse inserting resistor 802 of the "hundreds" register tube 801, target electrodes 210—211 are connected to the pulse inserting resistor 902 of the "thousands" register tube 901, etc.

Referring to Figure 2, the conducting plate 230 in back of the electron emissive sensitized target 91 of the electron beam tube 92 is connected to the top terminal of the resistor 231 and to a terminal of the capacitor 232. The other terminal of the capacitor 232 is connected to the grid resistor 233 and to the grid electrode of the thermionic tube 234. The cathode of this thermionic tube 234 is connected to the terminal 236 of the apparatus 237 and the lower terminals of the resistors 231 and 233 are connected to terminal 236a. The anode of the tube 234 is connected to the terminal 235 of the apparatus 237 and the cathode of the tube 234 is connected to the terminal 236 of this same apparatus. The apparatus shown in the block 237 in Figure 2 consists of the apparatus more completely shown in Figure 8 and it will be seen that the terminals 235 and 236 are connected to resistors 234a and 241, respectively. The tube 234 is connected as a cathode follower tube including a resistor 241 connected between the cathode thereof and the negative terminal of the battery 242, the positive terminal of this battery being connected to the anode of the tube 234 through the resistor 234a and terminal 235. The cathode follower resistor 241 is connected across the grid resistor 240 through the capacitor 239 so that voltage pulses produced across the cathode follower resistor 241 are impressed across the grid resistor 240 to key the electron beam of the electron beam device 197 and thereby cause this electron beam to transmit pulses to selected pairs of electrodes 204–227 of the target of tube 197.

*Accumulator or register circuit*

The accumulator or register comprising the cathode ray tubes 601, 701, 801, 901, 1001 and 1101 is of the character disclosed in our copending application, Serial No. 611,608, filed August 20, 1945. The register is adapted to receive the selected number of impulses from the related orders of the selection mechanism and accumulate the values therein in response to the number of pulses entered so as to be employed to obtain sums in addition or subtraction to display the product of a multiplication or the sums of products of successive multiplications and to serve in all particulars similar to the accumulator or total register of a calculating or adding machine of the mechanical type. The register tubes are reversible in character and are responsive to both positive and negative pulses to perform addition and subtraction, respectively, as determined by the setting of controls of the apparatus. Also, tens transfer mechanism is provided to transfer increments or pulses from order to order, i. e., from tube to tube, of the register as the transfers occur during the calculating operation. The cathode ray tube 601 (Figure 14) is in general of the same type as cathode ray tube 10 in that this tube is provided with an electron gun 606 for producing an electron beam and transmitting this beam substantially down the length of the tube. The beam passes between the deflector electrodes of the tube to complete the desired circuit at the righthand end of the tube and also activate the fluorescent figures or legends associated with the contactors at the right-hand end of the tube. Thus, the electron beam transmitted by the electron gun 606 of the tube 601 passes between the deflector plates 607 and 608, and after passing between the deflectors 607 and 608 the beam is employed to close the desired circuit associated with the contactors 609 to 618 and 619 to 628. These contactors are arranged in pairs as follows: 609—619, 610—620, 611—621, 612—622, 613—623, 614—624, 615—625, 616—626, 617—627, and 618—628, corresponding to digits from "zero" to "nine," respectively, and these digits are outlined in fluorescent material on the inside surface 629 of the right-hand end of the tube 601.

The contactors 609 to 618, inclusive, are connected together to a bus 630 which is connected to the variable resistor 631 and to the deflector plate 608. The electrodes 619 to 628, inclusive, are connected to taps 632 to 641, inclusive, respectively, of the voltage divider 642. The tap or terminal 641 of the voltage divider 642 is connected to the normally closed zeroizing or resetting key 643 and from this to the positive terminal of the battery 644, the negative of this battery being connected to the resistor 602 and through this to the deflector plate 607.

The above described register tube operates as described in said application in response to electrical signals or pulses to register a value corresponding to the number of pulses received thereby. The potential applied to the electrodes 607 and 608 is a measure of the value registered.

*Operation*

As previously mentioned, the value selecting apparatus 29 functions to project light spots representing various ordinal values on the sensitized cathode 91 of the tube 92 and the electron beam projected from the electron gun of the tube 92 is caused to scan the surface of the target cathode 91 through the operation of the scanning potential generating apparatus 100 and 101. As this beam scans the light spot areas of the mosaic cathode 91, the electrostatic charges applied to the grid of the amplifier tube 234 are varied in accordance with the aforesaid light spots so that the light spots projected on the mosaic cathode 91 are reproduced in the output circuit of the amplifier 234 in the form of electrical pulses and these electrical pulses control the electron beam of the tube 197, shown in Figure 8, so that the beam of the tube 197 transmits these pulses to the target electrodes thereof.

It will be observed that the light spots are projected upon the mosaic cathode 91 of the tube 92 in vertical rows and these vertical rows correspond to different orders. These vertical rows are arranged so that the cathode ray beam of the electron gun of the tube 92 scans them selectively through the operation of the scanning voltage generators 100 and 101. For example, the generator 100 produces one saw-tooth impulse which functions to deflect the beam of the tube 92 laterally while the generator 101 which is triggered or pulsed by the tube 123 produces twelve saw-tooth impulses which function to deflect the beam of the tube 92 vertically twelve times while the aforesaid beam is being deflected laterally once. Thus, the light spots of the first vertical row projected on the mosaic cathode 91 are translated into electrical pulses in the output of the tube 234 and applied to the control electrode 201 of the beam switching device 197, at the same time as the beam of the switching device 197 is positioned through the operation of the deflector electrodes 198—199 on the first pair of contacts 204—205. In this manner the electrical pulses corresponding to the first or right-most row of light spots projected on the cathode mosaic 91 are transmitted through the electrodes 204—205 to the deflector circuit of the first order register tube 601 through the resistor 602.

At the end of the vertical sweep of the cathode ray beam of the tube 92 across the mosaic cathode 91, this beam is blanked out by the blanking circuit 245 which is also controlled by electrical pulses from the generator apparatus 101 so that after the beam is swept upward over the mosaic cathode 91 it is not swept downward but instead is blanked out. When the beam of the tube 92 is restored, it is in position to move upward over the second row of light spots on the mosaic cathode inasmuch as the potential produced by the generator apparatus 100 applied to the coil 102 has increased sufficiently to move it to the next vertical row of light spots, i. e., the second order, and the second cycle of the generator apparatus 101 functions to sweep the beam upward over the second row of light spots, thereby producing electrical pulses in the output of the amplifier tube 234 corresponding to the second row of light spots on the cathode mosaic 91 of tube 92. The second cycle of the generator apparatus 101 also functions to charge the capacitor 190 as shown in Figure 7 with its second incremental charge, and this charge being applied to the deflector electrodes 198—199 of the switching tube 197 deflects the beam of this tube to the second pair of target electrodes 206—207 which are connected to the deflecting circuit of the second order register 701 so that the electrical pulses corresponding to the light spots on the second vertical row on the mosaic cathode 91 are transmitted to the second order register tube 701. Thereafter, that is, when the beam of the tube 92 reaches the top of the mosaic cathode 91 along the second row of light spots, the blanking circuit 245 is again operated and the beam of the tube 92 blanked out. When the beam of this tube is again restored, it is at the bottom of the mosaic cathode 91 in position to scan the third row of light spots and this row is scanned through the operation of the third sawtooth impulse transmitted to the deflector coil 103 from the generator apparatus 101. Since this generator apparatus 101 also furnishes the pulses to charge the capacitor 190 in step fashion, the third step of the charge of this capacitor 190 functions to deflect the beam of the tube 197 to the third pair of electrodes 208—209 so that the electrical pulses corresponding to the third row of light spots on the mosaic cathode 91 are transmitted to the third order register tube 801.

Likewise, the electrical pulses corresponding to the fourth row of light spots on the mosaic cathode 91 are transmitted to the fourth order register tube 901 and the electrical pulses corresponding to the fifth row of light spots on the mosaic cathode 91 are transmitted to the fifth order register tube 1001, and so on. Twelve orders of register tubes may be employed with the apparatus as disclosed since the generator apparatus 101 produces twelve saw-tooth pulses for each saw-tooth pulse produced by the generator apparatus 100 so that twelve rows of light spots may be positioned on the mosaic cathode 91 and scanned by the beam of the tube 92 for each lateral deflection of this beam. However, different numbers of rows of light spots other than twelve may be projected on the mosaic cathode 91 if desired, and different numbers of saw-tooth pulses other than twelve may be generated by the apparatus 101 for each pulse generated by the apparatus 100 and this is controlled by the number of pairs of target electrodes 133—156 provided to the tube 123. Thus, if more than twelve pairs of electrodes are provided to this tube, a correspondingly increased number of ordinal scanning pulses is produced by this tube per cycle.

In the foregoing description of the operation of this apparatus the electron beam of the tube 92 was scanned over the cathode mosaic target 91 through one complete cycle of the main scanning generator 100 and through twelve cycles of the auxiliary scanning generator 101 so that the surface of the target 91 was substantially completely scanned by the electron beam. It is of course obvious that it may be desired to enter the values set into the keyboard of this apparatus, shown in Figure 1, into the register consisting of the tubes 601a, also shown in Figure 1, more than once and for this purpose the target 91 of the tube 92 must be scanned as many times as it is desired to enter the values set into the keyboard into the registers 601a. The switches 116 and 160, shown in Figure 5, may be used to control the number of times the target 91 of the tube 92 is to be scanned. Closing the switch 116 to the right so that the battery 114 is connected directly to the grid 107 of the capacitor charging tube 104 permits this tube 104 to charge the capacitor 111 so that a saw-tooth pulse is applied to the input of the current amplifier 125 and the deflector coil 102 of the tube 92 is energized. A negative limiter tube 125a is connected across the deflector coil 102 for the purpose of limiting the negative swing of the pulses applied to the deflector coil 102. When the current amplifier 125 input circuit is energized, current for energizing the deflector coil 102 flows through this amplifier 125 from the battery 125b, the positive terminal of which is connected to the coil terminal 100b and the negative terminal of which is connected to the cathode of the amplifier 125. The positive terminal of this battery is also connected through a resistor 125c to the screen grid electrode of the amplifier 125.

If it is desired to limit the lateral scan of the electron beam of the tube 92 to one cycle so that the values are introduced only once in the register, the coil 102 of the mechanical deflector apparatus of the tube 92 must be energized by only one pulse each time the switch 116, as shown in Figure 5, is closed to the right. As explained above, closing the switch 116 to the right renders the pentode 104 conductive so that the capacitor 111 is charged therethrough in a gradual manner resembling a saw-tooth. When this capacitor 111 is charged to the breakdown voltage of the thyratron 117, this thyratron fires and discharges the capacitor 111 in an abrupt fashion. Inasmuch as the pentode 104 is in conductive condition as long as the switch 116 is positioned to the right, the capacitor 111 will receive another charge through the tube 104 as soon as it is discharged by the thyratron 117. As a result the electron beam of the tube 92 is scanned over the target 91 a second time and this operation may be repeated as long as the switch 116 is deflected to the right so that the value set into the keyboard of this apparatus may be translated into electrical pulses and transmitted to the register tubes 601a a multiplicity of times simply by leaving the switch 116 closed for the desired time interval and this time interval may be determined beforehand since the length of time required for charging the capacitor 111 through the pentode 104 is known. This charging time may be controlled by controlling the impedance of the pentode 104 during charging of the capacitor or by controlling the value of the resistor 112, and where desired the resistor 112 need not be connected in series with the capacitor 111 when this capacitor is discharged through the thyratron 117 since this thyratron may be connected directly across the capacitor 111.

Where it is desired to operate the apparatus only one cycle, that is, to apply only one pulse from the charging of the capacitor 111 to the electromagnetic deflector coil 102, the thyratron 117 may be disconnected from the capacitor 111 by the switch 119a so that the capacitor 111 cannot discharge through this thyratron until after the switch 116 is moved to the left thereby rendering the pentode 104 non-conductive at which time the switch 119a may be closed and the capacitor 111 discharged through the tube 117. As was pointed out above, the switch 116 is mechanically connected to switch 160, but electrically insulated therefrom so that when the switch 116 is positioned at the right the switch 160 is in contact with the terminal 162 and the switching tube 123 is in operative condition. However, when the switch 116 is at the left, the switch 160 contacts the terminal 161 and the tube 123 is inoperative as a switching device.

While only one amplifier tube 234 has been shown connected between the conductive plate 230 of the target of the cathode ray device 92, it is obvious that an amplifier consisting of several tubes connected in cascade, such as the amplifier shown on page 440 of the previously referred to book "Television" by Zworykin and Morton, may be employed. Furthermore, the input of this amplifier may be connected to the conductive plate 230 of the target 91 directly instead of through the capacitor 232, as shown in Figure 2, and in this case the grid of the tube 234 would be connected to the plate 230 and both the capacitor 232 and the resistor 231 omitted.

The target 91 of the tube 92 will take different forms depending upon the type of tube employed, and if the tube 92 is of the type commercially designated as an "iconoscope" then the sensitized surface 91 of the tube will comprise a cathode formed by evaporating a thin layer of silver upon an insulation disk of material, such as glass or mica. This thin layer of silver is evaporated on the cathode disk 244 after the tube has been evacuated and outgassed and the silver is then completely oxidized by a glow discharge in an atmosphere of oxygen at low pressure. Thereafter caesium is added from the inside of the tube to activate the cathode and the tube is baked for a short period after which an additional small amount of silver is evaporated to the cathode and the tube is again baked. This process is well-known in the art, and further details thereof may be obtained from the previously mentioned book entitled "Television."

*Modified ordinal pulse switching tube control*

The switching tube 197 (Figure 10) may be provided with a pair of beam deflecting electrodes 320 and 321 which are connected across the output resistor 240 of the amplifier 234 in series with the battery 322. This battery 322 supplies the beam deflecting potential to the deflecting electrodes 320 and 321 through the resistor 240 when no signal is applied to the input of the amplifier 234 and normally deflects the beam of the switching tube 197 downward against the apertured disk 323. However, when signal pulses are applied to the tube 234 from the electron beam device 92, as previously described, the potential drop across the resistor 240 due to the anode current of the amplifier tube 234 caused by the signal, overcomes the potential of the battery 322 and permits the beam of the cathode ray switching tube 197 to be projected through the aperture 324 of the disk 323 out through the anodes 202 and 203 between the deflecting electrodes 198—199 and upon the selected target electrodes of the group 204—227.

*Tens transfer circuit*

A tens transfer circuit is illustrated in Figure 11 in which the tens transfer is effected simultaneously with digitation in the cathode ray device 92 by selectively enabling tens transfer light indicia or spots in the proper ordinal relation under control of the register tubes. Referring to Figure 11, a bank of lights 300 is positioned with suitable light projecting lenses to project light spots on the lower portion of the cathode mosaic 91 of the electron beam device 92. The light apparatus 300 is provided with a plurality of lamps, each of which is positioned to project a light spot on a predetermined portion of the cathode mosaic 91 and each of which corresponds to and is controlled by one of the register tubes 601, 701, 801, 901, 1001, 1101, etc., respectively. The light spots projected from these lamps are in alignment with the ordinal rows of light spots projected on the cathode mosaic 91 so that each ordinal row, except the first, is provided with a tens transfer lamp in the bank of lamps 300. These lamps may be selectively energized from the tens transfer electrodes of the register tubes 601, 701, 801 901, 1001, 1101, etc., respectively. For this purpose the tens transfer electrodes (662—663, 664—665 of the tube 601, for example) of the tubes 601, 701, 801, 901, 1001, 1101, etc., may be connected to the grid and cathode of small thyratron tubes 301, 302, 303, 304, 305, 306, etc., respectively, and the output circuits of these small thyratrons 302, 303, 304, 305, 306, etc., may be connected to the small lights 307, 308, 309, 311 and 312, respectively, in the light bank 300.

Thus, when a tens transfer pulse is applied, for example, by the register tube 601, for the next order register the thyratron 301 is fired and the transfer light 307 projects a small light upon the bottom portion of the cathode mosaic 91 just below the second order row of light spots on this cathode mosaic. As a result, when the beam of the electron beam device 92 scans the second row of light spots on the cathode mosaic 91, an additional electrical impulse corresponding to this tens transfer light spot is supplied to the amplifier 234 and is transmitted through the switching tube 197 to the second order register tube 701.

Similarly, when the tens transfer electrodes of the tube 701 are energized, the thyratron 302 is fired and the transfer light 308 projects a small light spot just below the third order of the cathode mosaic 91, and, when the beam of the electron beam device 92 scans the third order row of vertical light spots, it also scans this tens transfer light spot and the electrical impulse corresponding thereto is transmitted to the third order register tube 801. Likewise, the lamps 309, 310, 311 and 312 may be energized for tens transfer purposes by the register tubes 801, 901, 1001, 1101, respectively, and the associated thyratron tubes 302, 303, 304, 305 and 306, respectively, to supply tens transfer light indicia to the fourth, fifth, sixth and seventh orders in the selection tube 92 for transmission to the register tubes 901, 1001, 1101, etc., respectively.

*Modified transfer circuit of Figure 12*

The embodiment of this invention employing the thyratron tubes 301 to 306, inclusive, associated with the register tubes 601 to 1101, inclusive, respectively, as shown in Figure 11, may employ light sensitive thyratron tubes 301a, 302a, 303a, 304a, etc., as shown in Figure 12, in place of the thyratron tubes 301, 302, 303, etc., shown in Figure 11 for tens transfer purposes. Employing the light sensitive thyratron tubes 301a, 302a, 303a, etc., as shown in Figure 12, necessitates slight changes in the register tubes 601, 701, 801, etc., in that the tens transfer electrodes 662, 663, 664 and 665 of tube 601 are replaced by fluorescent coatings 301b adjacent to the thyratron tubes 301a, but inside of the envelope of the tube 601, so that these fluorescent coatings 301b are energized and caused to fluoresce by the cathode ray beam of the tube 601 for tens transfer purposes and the fluorescent light from these fluorescent material patches is transmitted into the thyratron tubes 301a, the top thyratron tube 301a being energized by the fluorescent light from the associated patch 301b for additive operations and the bottom patch and thyratron being energized for subtractive operations. The same arrangement is provided in the register tube 701 in which the electrodes such as 762, are replaced by two spots or patches of fluorescent material on the inside of the tube directly behind the position occupied by these electrodes so that the upper thyratron 302a is energized by a light from the fluorescent spot 302b associated therewith for additive tens transfer operation, and the lower spot 302b is energized to transmit light to the lower thyratron 302a for subtractive tens transfer operations. While the fluorescent spots 301b, 302b, and 303b, etc., are positioned on the inside of the register tubes 601, 701, 801, etc., in alignment and in the back of the corresponding tens transfer electrodes 662, 663, 664 and 665, in the case of the tube 601, and the similar transfer electrodes in the case of the register tubes 701, tube 801, etc., the thyratrons 301a, 302a, 303a, etc., are on the outside of the register tubes 601, 701, 801, etc., respectively.

The thyratrons are of a small construction and each includes a cathode, a grid and an anode positioned in an envelope of glass or metal as desired. Where an envelope of glass is employed, the outside thereof is coated with an opaque material, such as "Aquadag" over the entire surface except where light from the fluorescent material is to be admitted into the inside of the envelope. Care must be taken not to short circuit the lead-in conductors to the cathode, grid and anode of the thyratron with the aquadag coating.

Where a metal envelope is employed a suitable transparent window is provided through the metal for admission of light from the fluorescent spot associated with the respective thyratron, and, furthermore, the leads to the cathode, grid and anode of the thyratron must be insulated from the metal envelope by means of suitable glass beads or glass headers.

The cathodes of the thyratrons 301a, 302a, 303a, are all connected together to a tap 325 of the voltage divider 326. The voltage divider 326 is connected across a suitable source of direct current voltage 327, such as a battery or rectified alternating current supply or the like. The negative terminal of the voltage divider 326 is connected to the grid electrode of all of the thyratrons 301a, 302a, 303a, etc., and the anodes of these thyratrons are connected to the positive terminal of the voltage divider 326 through the fluorescent lamps 328, 329, 330 and associated resistors 331, 332, 333, respectively.

The fluorescent lamps 328, 329 and 330 are small bulbs each having a small quantity of mercury therein which is ionized by a potential across the bulb controlled by the associated thyratron and the ionized mercury generates ultraviolet light which energizes a fluorescent chemical coating of material, such as Willemite, zinc sulphide and the like, coated on the inside of the bulbs 328, 329 and 330, respectively.

Thus, when the beam of the register tube 601 is deflected to the position of electrodes 664—665, it is in position to energize the fluorescent spot 301b which replaces the electrode 664—665. When the spot 301b is thus energized, it transmits light into the thyratron 301a which causes this thyratron to fire since the light transmitted into the thyratron ionizes the gas therein and causes the grid of the tube to lose control. As a result, the current flowing through the thyratron 301a from the source 327 increases very rapidly and this increased current increases the voltage drop across the resistor 331 and this increased voltage drop fires the fluorescent lamp 328.

The fluorescent lamps 328, 329, 330, etc., are associated with the cathode mosaic 91 of the electron beam tube 92 shown in Figures 1 and 2, in such a way that the lamp 328 when illuminated projects a light spot 328a on the cathode mosaic 91 directly below the second order vertical row of light spots projecting on this cathode mosaic on the light projecting apparatus 29, a lamp 329 is positioned to project a light spot 329a on the cathode mosaic 91 directly below the third order vertical row of light spots projected on this cathode mosaic by the apparatus 29 and lamp 330 is arranged to project a light spot 330a directly below the fourth order light spots on the cathode mosaic 91, etc. Thus, it will be seen that when the tens transfer light spot 328a is projected below the second order row of light spots on the cathode mosaic 91, when the thyratron 302a associated with the register 701 is fired, the lamp 329 is energized and projects a light spot 329a below the third order row of light spots on the mosaic 91 and when the thyratron 303a is fired, the lamp 330 is energized and projects a light spot 330a just below the fourth order row of vertical light spots on the cathode mosaic 91. Of course, it is obvious that the thyratrons associated with the register tubes 901, 1001, 1101, etc., are connected in the same manner as the thyratrons 301a, 302a, 303a, etc., and are provided with circuits to control lamps such as 328, 329, 330, so that the fifth, sixth, seventh, eighth, etc., orders rows of light spots on the mosaic 91 will of course also be provided with tens transfer light spots such as 328a, 329a, 330a, as described above.

After the electron beam of the tube 92 scans the cathode mosaic completely from the right-hand side to the left-hand side, as explained above, it impinges upon a pair of electrodes 331a formed in the lower left-hand corner of the cathode mosaic 91 and insulated from this cathode mosaic by suitable insulation means. These electrodes 331a are connected to the input of a suitable amplifier 332a, the output of which is connected to the relay 333a connected between the voltage divider 326 and the source of current supply 327 and as a result when the electron beam of the tube 91 closes the circuit between the electrodes 331 the amplifier 332a causes the relay 333a to open the contacts thereof and interrupt the circuit between the voltage divider 326 and the source of current supply 327, thereby interrupting the anode current to the thyratrons 301a, 302a, 303a, etc., at the end of the scanning cycle and permitting each of the thyratrons to deionize. As a result, when the electron beam of the tube 92 leaves the contacts 331a after momentarily impinging thereon, the thyratrons 301a, 302a, 303a, etc., will be de-ionized, and, when the relay 333a is de-energized so that the contacts thereof close and apply the potential from the source 327 to the voltage divider 326, the grid electrodes of each of the voltage thyratrons will have regained control. Consequently, these thyratrons will not be in firing condition until again energized by the associated fluorescent spots for tens transfer purposes.

It will be observed that the operation of the above tens transfer circuit must be rapid enough so that the tens transfer spots 328a, 329a, 330a, etc., are in position below the second, third and fourth order light spot rows on the mosaic 91 before the electron beam of the tube 92 starts scanning these vertical rows of light spots. For example, after the electron beam of the tube 92 scans over the first row of light spots in the first order on the mosaic 91 if there is to be a transfer into the second order register tube 701 the light spot 328a must be in position below the second order row of light spots on the mosaic 91 before the beam from the tube 92 starts scanning this second order row of light spots.

In order to insure sufficient time for this operation, a suitable limiting tube 334 (Figure 6) is provided in the circuit of the deflection coil 103 to cut off the lower portion of the scanning saw-tooth wave applied to this coil 103, as shown in Figure 6A, so that only portions 335 of the saw-tooth waves applied to this coil will be effective in moving the electron beam of the tube 92. As a result, the time interval 336 will be a time of inaction so far as the electron beam of the tube 92 is concerned inasmuch as the electron beam has been acted on by the top sloping portion of the scanning wave 335. The beam is blanked out at the top of the wave 335 and when it is restored it is at the bottom of the cathode mosaic 91 beneath the tens transfer light spots 328a, 329a, etc., and rests there substantially during the time interval 336 until the saw-tooth wave is of a voltage sufficient to overcome the limiter tube 334 and reaches the bottom of the scanning wave 335. During the interval 336 the light spot 328a is flashed on the cathode mosaic 91 and is in position thereon when the electron beam is started on its scanning cycle so that this light spot 328a causes an electrical pulse to be transmitted through the amplifier 234, as shown in Figure 2, the apparatus 237 and this electrical pulse is added to the register 701. Likewise, after tens transfer thyratron 302a associated with the register tube 701 is fired, the lamp 329 projects a transfer light spot 329a on the mosaic 91 and so on.

Counter

A counter of the type disclosed in our application, Serial No. 611,608, filed August 20, 1945, may be employed in accordance with this invention with a slightly modified form of electron tube, such as tube 92 shown in Figures 12 and 15. This counter is designated by the reference numeral 380 (Figure 15) having input terminals 381 and 382 connected across a resistor 383. The input terminal 381 is also connected to one of the electrodes 331b positioned along the side of the target 91 of the tube 92, as shown in Figure 12, and the terminal 382 is connected to the positive terminal of a battery 385, the negative terminal of which is connected to the cathode of the electron gun of the tube 92. With this arrangement the number of scanning cycles completed by the tube 92 are counted by the item counter 380 since each time the beam of the tube 92 scans the target 91, it energizes the input of the counter 380 by completing a circuit of the revolutions counter 380 when it engages the auxiliary electrode 331b. It will be apparent that 13 pulses are required for completely scanning the target 91 of the tube 92 in this case since twelve pulses are required for scanning the ordinal arrays of light spots, as previously described, and the thirteenth pulse is required for scanning the beam of the tube 92 over the electrode 331b. This, of course, presents no difficulty since the pulse generator 191 (Figure 6) and tube 123 (Figure 5) previously described for generating the twelve pulses may be arranged to generate thirteen pulses instead of twelve.

Control of ordinal entry of pulses

For multiplying and dividing operations it is desirable to enter values from the tube 92 in various selected ordinal positions. For this purpose a tapped battery or other source of electric voltage may be provided between the terminal 196a (Figure 7) connected to the battery 195 and resistor 196 and the terminal 198a of the deflector electrode 198 of the tube 197 (Figure 8), the terminals 196b (Figure 7) and 199a (Figure 8) remaining connected as before. Such a tapped battery 195a is shown in Figure 7a and the purpose thereof is to shift the position of the beam of the tube 197 so that when the first tap 195b of this battery is connected by the switch 195c the beam of the tube 197 will impinge initially on the tens order electrode 206—207 instead of on the units order electrodes 204—205. In other words, the beam is shifted or biased one step by connecting the battery 195a to the first tap 195b and applying the potential from this tap to the voltage divider 195d, the terminals 195e and 195f are connected to the terminals 196a (Figure 7) and 198a (Figure 8), respectively. Connecting the battery to the second tap 195g through switch 195h will advance the beam of the tube 197 two steps, that is, to electrodes 208—209 from the electrodes 204—205 and connecting the third tap 195i of the battery will advance the beam of the tube 197 to electrodes 210—211 on the electrodes 204—205. In this manner, this apparatus may be conveniently employed for multiplication since the pulses that would normally be fed into the circuit of the electrodes 204—205 of the switching tube 197 may be fed into the electrodes 206—207 or 208—209 or electrodes 210—211 instead, and of course, the following electric pulses will be fed into the succeeding electrodes of the tube 197 as the beam of this tube is advanced over the tube electrodes in step fashion, as previously described.

*Variable pulse delay control of ordinal entry*

Inasmuch as the operation of the scanning circuits of the tube 92 and the operation of the beam deflection circuit of the switching tube 197 are both controlled from a central oscillator 100, shown in Figure 5, these tubes will have a definite timed relation in their operation so that the electrical pulses produced in the output circuit of the tube 92 and amplified by the amplifier 234 will be fed into the switching tube 197 to be redistributed to the respective registers at the proper timed intervals. In fact, it may be desirable to introduce a variable time delay element into the input or output circuit of the amplifier 234 so that the time of the pulses received from the tube 92 may be slightly varied with respect to the deflection of the electron beam of the switching tube 197 and this may be accomplished by placing a time delay element such as an inductance, or a resistor-capacitor circuit or an inductance-capacitor circuit into either the input or the output circuit of the amplifier 234 or into both input and output circuits of this amplifier. As a result, varying such a time delay circuit will introduce a time element into the transmission of the electric pulses through this amplifier and the circuits associated therewith which time element may be controlled and sufficient delay in the feeding of electrical pulses into the switching tube 197 may be accomplished so that the electrical pulses intended for the contacts 204—205 of the switching tube 197 may in fact be fed into the contacts 206—207 or into the contacts 208—209 as desired and so on.

*Plural cycle control*

A modified form of pulse generating circuit is shown in Figure 13 which may be employed for controlling the sequence of operation of the tube 104 (Figure 5) by controlling the grid bias of this tube from the output resistor 359 or this circuit (Figure 13) may be used to produce a selected number of pulses in the output of tube 123 (Figure 5). This pulse generating circuit employs a capacitor charging tube 350 (either gas or vacuum) which is provided with a cathode 351, a grid electrode 352 and an anode 353. A grid bias battery 354 is connected between the cathode 351 and the grid 352 through a switch 355 and a resistor 356 so that when the switch 355 is closed the tube 350 is conductive. One side of the capacitor 357 is connected to the battery 358 by the resistor 360 and the switch 366. The gas discharge tube 361 is provided with three electrodes, namely, a cathode 362, an anode 363 and a control electrode 364. The control electrode 364 is connected through a capacitor 365 and through the switch 366 to the battery 358; the anode 363 is connected to the capacitor 357 and the cathode 362 is connected to one terminal of the output resistor 359; the other terminal of which is connected to the anode 353 of the tube 350. The switch 366 is mechanically ganged to the main control switch 355; and when the switch 366 is closed the gas tube 361 is fired by the charging pulse flowing into the relatively small capacitor 365. Charging of the capacitor 357 is initiated when the tube 361 fires and when the capacitor 357 is charging a pulse is produced across the output resistor 359. When the capacitor 357 is substantially charged another capacitor 363b connected between the resistors 360 and 363a is charged to provide the required grid pulse for firing the next gas discharge tube 369 which is the same type of tube as 361. This second gas tube 369 will be fired if the switch 368 is closed. If the switch 368 is closed, an electric potential is applied from the cathode to the anode of the gas tube 368 through the resistor 370 sufficient to ionize the gas tube 369 if the grid thereof is properly energized, and permit the charging of the capacitor 367 from the battery 358 through the resistor 359, tube 350 and switch 368, thus producing a second pulse through the resistor 359. A third pulse may be produced through this resistor by charging the third capacitor 374 if the switch 375 is closed since a firing potential is applied to the grid of the gas tube 373 in the charging of the capacitor 369a after the capacitor 367 is charged or substantially charged. Additional pulses may be produced through the output resistor 359 by adding additional capacitors, resistors and gas discharge devices depending upon the number of pulses it is desired to produce in an operation.

While the invention has been illustrated and described in connection with a preferred embodiment thereof, it is capable of other variations and modifications within the scope of the claims appended hereto.

We claim:

1. In an electronic calculator, a registering device, a cathode ray tube having a light-responsive screen and an electron gun for producing a screen-scanning electron beam, means for producing a light indicia on said screen representing a number, means controlled by said electron beam for transmitting electrical pulses representing said number to said registering device in response to scanning of said light indicia on said screen, and an electric circuit controlled by said registering device for producing additional light indicia on said screen.

2. An electronic calculator comprising in combination: an electron tube having an electron emissive target and having means for scanning said target with accelerated electrons and also having an output circuit; means for energizing an ordinal array of spots on said electron emissive target representing values from "1" to "9" to cause said spots to emit electrons when scanned by said accelerated electrons; a plurality of orders of electronic registering devices; an electronic switching device for coupling said electron tube output circuit selectively to different orders of said electronic registering devices, and pulse generating means for controlling said electron tube scanning means and said electronic switching device in timed relation.

3. An electronic calculator comprising in combination: a keyboard; an optical system controlled by said keyboard; an electron tube having an electron emissive target and having means for scanning said target with accelerated electrons and also having an output circuit; means associated with said optical system for energizing an ordinal array of spots of said electron emissive target representing values from "1" to "9" to cause said spots to emit electrons when scanned by said accelerated electrons, a plurality of orders of electronic registering devices, an electronic switching device for coupling said electron tube output circuit selectively to different orders of said electronic registering devices, and pulse generating means for controlling said electron tube scanning means and said electronic switching device in timed relation.

4. An electronic calculator comprising in combination: an electron tube having an electron emissive cathode mosaic target and having means for scanning said target and also having an output circuit; means for projecting beams of radiant energy upon said electron emissive target to produce ordinal sets of pulses representing values from "1" to "9" in said output circuit when said target is scanned; a plurality of orders of registering electronic devices; an electronic switching device for coupling said electron tube output circuit selectively to different orders of said registering electronic devices; and pulse generating means for controlling said electron tube scanning means and said electronic switching device in timed relation.

5. In an electronic calculator, a cathode ray tube having a light responsive screen and an electron gun for producing a screen scanning electron beam, means for producing a plurality of columns of light patterns each of incremental character on said screen for scanning by said beam and each of said columns representing a number, a registering device for receiving incremental signals derived by scanning said columns of light patterns on said cathode ray tube screen for entry therein of the numbers represented by the signals, and an electrical circuit controlled by said registering device for producing an incremental signal on said screen representing a transfer increment for scanning by said beam.

6. In an electronic calculator, a registering device, a cathode ray tube having a light responsive screen and an electron gun for producing a screen scanning electron beam, means for producing a plurality of columns of light indicia on said screen, each of said columns representing a number, means controlled by said electron beam for transmitting numbers of pulses to said registering device in response to scanning of said screen, and an electrical circuit controlled by said registering device for producing additional light indicia in one of said columnar light indicia on said screen.

7. In an electronic calculator, a registering device, a cathode ray tube having a light responsive screen and an electron gun for producing a screen scanning electron beam, means for producing a column of light dots on said screen representing a number, means controlled by said electron beam for transmitting values as represented by said column of light dots to said registering device in response to scanning of said screen, and an electrical circuit controlled by said registering device for producing an additional light dot on said screen as a part of said column.

8. In an electronic calculator, a registering device, a cathode ray tube having a light responsive screen and an electron gun for producing a screen scanning electron beam, means for selectively producing a plurality of orders of incremental light patterns on said screen representing a plural digit number, means for scanning said light patterns on said screen order by order by said electron beam for transmitting numbers of pulses to said registering device in response to scanning of said screen, and an electrical circuit controlled by said registering device for producing additional incremental light indicia in one of said orders on said screen.

9. An electronic calculator comprising in combination an electro-optical device for producing successive ordinal series of incremental electrical pulses corresponding to certain predetermined numbers, a plurality of ordinally arranged registering devices, a switching device connected between said electro-optical device and said registering devices, a timing device comprising an electron discharge device connected to control said switching device for entry of the successive ordinal series of electrical pulses produced by said electro-optical device into successive orders of said registering devices, and an electrical circuit for selecting the ordinal position of entry of values into said registering devices.

10. In a calculator, selection mechanism comprising a cathode ray tube having a light responsive screen and an electron gun for producing a screen-scanning electron beam, and also comprising an optical system for producing an ordinally arranged light pattern on said screen, said optical system including means for producing a differential light pattern for each order of a plural figure value with each ordinal pattern confined to a given ordinal area of the screen, means for controlling said electron beam to scan each ordinal area as a unit and to scan said ordinal areas in succession to produce a differential signal for each ordinal area, with respective differential signals occurring as a sequence, a plural order differential signal responsive registering means, and means for transmitting said sequence of signals to the respective orders of said registering means.

11. In a calculator, selection mechanism comprising a cathode ray tube having a light responsive screen and an electron gun for producing a screen-scanning electron beam, and also comprising a differentially settable optical system for producing an ordinally arranged light pattern on said screen, said optical system including means for producing a differential light pattern of columnar arrangement for each order of a plural figure value with each ordinal pattern confined to a given ordinal area of the screen, means for controlling said electron beam to scan each ordinal area as a unit and to scan said ordinal areas in succession to produce a differential signal for each ordinal area, with respective differential signals occurring as a sequence, a plural order differential signal responsive registering means, and means for transmitting said sequence of signals to the respective orders of said registering means.

12. In a calculator, selection mechanism comprising a cathode ray tube having a light responsive screen and an electron gun for producing a screen-scanning electron beam, and also comprising an optical system for producing an ordinally arranged light pattern on said screen, said optical system including means for producing a differential light pattern for each order of a plural figure value with each ordinal pattern confined to a given ordinal area of the screen, means for controlling said electron beam to scan each ordinal area as a unit and to scan said ordinal areas in succession to produce a differential signal for each ordinal area, with respective differential signals occurring as a sequence, a plural order differential signal responsive registering means including ordinal tens transfer means, means for transmitting said sequence of signals to the respective orders of said registering means, and means controlled by said ordinal tens transfer means for producing a tens transfer light pattern on said screen in coordinated ordinal relation to said first-named light pattern.

13. In a calculator, a cathode ray tube having a light-responsive screen and an electron gun for producing a screen-scanning electron beam, means for producing light indicia on said screen in an ordinal array to represent a plural order value, means for causing said beam to scan said indicia order by order, a plural order register, means for transmitting ordinal signals from said cathode ray tube to said register in ordinal fashion, said register including ordinal tens transfer means for producing ordinal transfer signals, and transfer signal responsive means for producing tens transfer light indicia on said screen in coordinated ordinal relation to said first-named light indicia for scanning by said beam.

14. In a calculator, selection mechanism comprising a cathode ray tube having a light responsive screen and an electron gun for producing a screen-scanning electron beam, and also comprising an optical system for producing an ordinally arranged light pattern on said screen, said optical system including means for producing a differential light pattern for each order of a plural figure value with each ordinal pattern confined to a given ordinal area of the screen, means for controlling said electron beam to scan each ordinal area as a unit and to scan said ordinal areas in succession to produce a differential signal for each ordinal area, with respective differential signals occurring as a sequence, a plural order differential signal responsive registering means, means for selecting the orders of said registering means to receive the differential signals, and means for transmitting said sequence of signals to selected orders of said registering means.

15. In a calculator, selection mechanism comprising a cathode ray tube having a light responsive screen and an electron gun for producing a screen-scanning electron beam, and also comprising a differentially settable optical system for producing an ordinally arranged light pattern on said screen, said optical system including means for producing a differential light pattern of columnar arrangement for each order of a plural figure value with each ordinal pattern confined to a given ordinal area of the screen, means for controlling said electron beam to scan each ordinal area as a unit and to scan said ordinal areas in succession to produce a differential signal for each ordinal area, with respective differential signals occurring as a sequence, a plural order differential signal responsive registering means, means for selecting the orders of said registering means to receive the differential signals, and means for transmitting said sequence of signals to selected orders of said registering means.

16. In a calculator, selection mechanism comprising a cathode ray tube having a light responsive screen and an electron gun for producing a screen-scanning electron beam, and also comprising an optical system for producing an ordinally arranged light pattern on said screen, said optical system including means for producing a differential light pattern for each order of a plural figure value with each ordinal pattern confined to a given ordinal area of the screen, means for controlling said electron beam to scan each ordinal area as a unit and to scan said ordinal areas in succession to produce a differential signal for each ordinal area, with respective differential signals occurring as a sequence, a plural order differential signal responsive registering means including ordinal tens transfer means, means for selecting the orders of said registering means to receive the differential signals, means for transmitting said sequence of signals to selected orders of said registering means, and means controlled by said ordinal tens transfer means for producing a tens transfer light pattern on said screen in coordinated ordinal relation to said first-named light pattern.

17. In an electronic calculator, selection mechanism comprising a cathode ray tube having a light responsive screen and an electron gun for producing an electron beam, a differentially settable optical system for producing a plurality of groups of light spots on a predetermined path on said screen, each of said groups of spots representing a different order number of a plural order number, means for scanning said beam over said predetermined path to produce groups of electrical pulses corresponding to the said groups of light spots, an output circuit, and connections for connecting said output circuit to said cathode ray tube for utilizing said electrical pulses.

18. In an electronic calculator, selection mechanism comprising a cathode ray tube having a light responsive screen and an electron gun for producing an electron beam, differentially settable means for producing a plurality of groups of light spots on said screen, each of said groups of spots representing a different order number of a plural order number, means for scanning said beam over said groups of light spots order by order to produce groups of electrical pulses corresponding to the orders of said plural order number, means for generating electrical oscillations for controlling said scanning means, an output circuit, and connections for connecting said output circuit to said cathode ray tube for utilizing said electrical pulses.

19. In an electronic calculator, the combination of a selection mechanism comprising a device for representing a plural figure number by plural columnar patterns of electrically charged areas, said device having means for producing electrical pulses corresponding to said electrically charged areas, each of the columns of said plural columnar patterns representing a figure of said plural figure number, said device having electrical controls for arranging said groups of pulses so that each of said groups represents one of the figures of said plural figure number, said controls also having means for arranging said groups of pulses in the same sequence as the figures of said plural figure number, a register adapted to count said pulses, and an electric circuit connected between said electrical device and said register for feeding said groups of pulses to said register beginning with the group corresponding to the lowest order of said plural figure number and continuing with the other of said groups order by order.

20. In an electronic calculator, the combination of a selection mechanism comprising a device for representing a plural figure number by patterns of electrically charged areas, each of said patterns representing a figure of said plural figure number, an electrical device for producing a plurality of groups of electrical pulses from said patterns of electrically charged areas in said first mentioned device, said electrical device having electrical controls for arranging said groups of pulses so that each of said groups represents one of the figures of said plural figure number, said controls also having means for arranging said groups of pulses in the same sequence as the figures of said plural figure number, a register adapted to count said pulses, and an electric circuit connected between said electrical device and said register for feeding said groups of pulses to said register beginning with the group corresponding to the lowest order of said plural figure number and continuing with the other of said groups order by order.

21. In an electronic calculator, the combination of a selection mechanism comprising a device for representing a plural figure number by patterns of electrically charged areas, each of said patterns representing a figure of said plural figure number, an electrical device for producing a plurality of groups of electrical pulses from said patterns of electrically charged areas in said first mentioned device, said electrical device having electrical controls for arranging said groups of pulses so that each of said groups represents one of the figures of said plural figure number, said controls also having means for arranging said groups of pulses in the same sequence as the figures of said plural figure number, a register adapted to count said pulses, said register having a plurality of branches, each of said branches corresponding to an order of said register, an electric circuit connected between said electrical device and said register for feeding said groups of pulses to said register beginning with the group corresponding to the lowest order of said plural figure number and continuing with the other of said groups order by order and an electrical control for controlling the branch of said register into which said groups of pulses are fed.

22. In a calculator, a registering device, a cathode ray tube having a light responsive screen and electron gun for producing a screen scanning electron beam, means for producing light indicia on said screen representing a number, means for producing additional light indicia on said screen representing a second number, said second light indicia being ordinally related to said first light indicia, means controlled by said electron beam for transmitting values to said registering device in response to scanning of said screen, whereby the sum of the numbers represented by the two indicia is registered in the registering device.

23. In an electronic calculator, a register comprising an ordinal series of registering devices, ordinal selection mechanism related to said register comprising a cathode ray tube having a light responsive screen and means for producing light indicia in an ordinal array on said screen to represent a plural order number, means controlled by the electron beam of said tube for transmitting numbers to said register, the respective ordinal numbers from the selection mechanism being transmitted respectively to related orders of the registering devices, and means controlled by an ordinal registering device for producing additional light indicia in the next higher order of said selection mechanism for entry with the ordinal light indicia in said next higher order registering device.

24. In a calculator, a registering device, a cathode ray tube having a target electrode and electron gun for producing an electron beam for impinging on said electrode, means for producing electrically charged areas on said electrode representing a number, means for producing an additional electrically charged area on said electrode representing a second number, said second additional area being ordinally related to said first area, means controlled by said electron beam for transmitting values to said registering device in response to scanning of said electrode, whereby the sum of the numbers represented by said areas is registered in the registering device.

25. In an electronic calculator, a register comprising an ordinal series of registering devices, ordinal selection mechanism related to said register comprising a cathode ray tube having a target electrode and means for producing electrically charged areas in an ordinal array on said electrode to represent a plural order number, means controlled by the electron beam of said tube for transmitting numbers to said register, the respective ordinal numbers from the selection mechanism being transmitted respectively to related orders of the registering devices, and means controlled by an ordinal registering device for producing an additional electrically charged area in the next higher order of said selection mechanism, said additional area and said ordinal charged areas in said next higher order together being adapted to produce a number for entry in said registering device.

26. In a calculator, a register having a series of ordinal registering devices responsive to impulses from one to nine to register a number, selection mechanism having means for producing a plurality of electrically charged areas arranged in ordinal array with an order of the selection mechanism related respectively to an ordinal registering device, said mechanism having means for producing electrical impulses corresponding to said charged area, and means connected between said mechanism and said registering device for transmitting said impulses to said registering device for registering therein, and means controlled by an ordinal registering device of the register for energizing a transfer circuit in the next higher order of the selection mechanism by electrically charging an additional area in said next higher order.

27. In an electronic calculator, a selection mechanism comprising a cathode ray tube having a light-responsive screen and an electron gun for producing a screen-scanning electron beam, means for producing a light pattern of an ordinal array of numbers, including means for confining each ordinal light pattern to a given ordinal area on said screen, an electric circuit for controlling said electron beam to effect scanning from number to number through said ordinal array, and an electric circuit for transmitting successive signals each corresponding to one of said ordinal numbers from said tube upon scanning of said light pattern by said beam, a plural order register connected to said electric circuit, said electric circuit having means for determining which order of said register is to receive the transmitted signals.

28. In a calculator, a register having a series of ordinal registering devices responsive to impulses from one to nine to register a number, selection mechanism arranged in ordinal array with an order of the selection mechanism related respectively to an ordinal registering device to transmit a number for registering therein, tens transfer means operated by an ordinal registering device of the register and including means for placing a transfer impulse in the next higher order of the selection mechanism by increasing the value in said next higher order by one, and means for effecting transmission of a number from an order of the selection mechanism to the related ordinal registering device which represents the sum of the number set in the selection mechanism and the transfer impulse.

29. In a calculator, a register having a series of ordinal registering devices responsive to impulses from one to nine to register a number, selection mechanism arranged in ordinal array with an order of the selection mechanism related respectively to an ordinal registering device to transmit a number for registering therein, electrical tens transfer means operated by an ordinal registering device of the register and including means in the next higher order of the selection mechanism connected to said ordinal registering device for producing a transfer signal in said next higher order, and electrical means for effecting transmission of a number from an order of the selection mechanism to the related ordinal registering device which represents the sum of the number set in the selection mechanism and the transfer impulse.

30. In a calculator, a register having a series of ordinal registering devices responsive to impulses from one to nine to register a number, selection mechanism arranged in ordinal array with an order of the selection mechanism related respectively to an ordinal registering device to transmit a number for registering therein, tens transfer means controlled by an ordinal registering device of the register for transmitting a signal to the next higher order of the selection mechanism for producing a transfer signal therein for registry simultaneously with the number in said higher order, and means for effecting transmission of a number from an order of the selection mechanism to the related ordinal registering device which represents the sum of the number set in the selection mechanism and the transfer impulse.

31. An electronic calculator comprising in combination a plurality of differentially operable optical devices, an electrical device responsive to said optical devices for producing a series of incremental electrical pulses corresponding to certain predetermined values, a plurality of registering devices responsive to individual electrical pulses irrespective of the rates at which said pulses are produced by said electrical device, a switching device comprising an electrical discharge device connected between said electrical device and said registering devices, and a timing device comprising a second electrical discharge device for controlling the generation of pulses by said electrical device and for controlling said first mentioned electrical discharge device for entry of each series of incremental electrical pulses produced by said electrical device into any selected one of said registering devices.

32. An electronic calculator comprising in combination an electrical device for producing a series of incremental electrical pulses corresponding to certain predetermined ordinal values, a plurality of registering devices responsive to individual electrical pulses irrespective of the rates at which said pulses are produced by said electrical device, a switching device comprising an electrical discharge device connected between said electrical device and said registering devices, and a timing device comprising a second electrical discharge device for controlling the generation of pulses by said electrical device and for controlling said first mentioned electrical discharge device for entry of each series of incremental electrical pulses into any selected one of said registering devices.

33. An electronic calculator comprising in combination a plurality of differentially operable optical devices, an electrical device responsive to said optical devices for producing successive sets of ordinally related electrical pulses corresponding to certain predetermined values, a plurality of ordinally arranged registering devices responsive to individual electrical pulses irrespective of the rates at which said pulses are produced by said electrical device, a switching device comprising an electrical discharge device connected between said electrical device and said registering devices, a timing device comprising a second electrical discharge device for controlling said electrical discharge device for entry of the respective sets of electrical pulses produced by said electrical device into said registering devices to produce a plural order registration therein, and means for selecting the ordinal position of entry of the plural order value into said registering devices.

BENJAMIN J. CHROMY.
PHILIP H. ALLEN.

References Cited in the file of this patent

UNITED STATES PATENTS

| Number | Name | Date |
| --- | --- | --- |
| 2,097,392 | Finch | Oct. 26, 1937 |
| 2,131,886 | Francis | Oct. 4, 1938 |
| 2,207,716 | Bumstead | July 16, 1940 |
| 2,302,009 | Dickinson | Nov. 17, 1942 |
| 2,401,021 | Rosenberg et al. | May 28, 1946 |
| 2,401,621 | Desch et al. | June 4, 1946 |
| 2,404,106 | Snyder, Sr. | July 16, 1946 |
| 2,404,739 | Mumma | July 23, 1946 |
| 2,404,920 | Overbeck | July 30, 1946 |
| 2,405,096 | Mumma | July 30, 1946 |
| 2,416,793 | Compton | Mar. 4, 1947 |
| 2,435,840 | Morton | Feb. 10, 1948 |
| 2,497,042 | Henri-Georges Doll | Feb. 7, 1950 |
| 2,502,360 | Williams | Mar. 28, 1950 |
| 2,517,712 | Riggen | Aug. 8, 1950 |
| 2,528,100 | Williams | Oct. 31, 1950 |

FOREIGN PATENTS

| Number | Country | Date |
| --- | --- | --- |
| 502,560 | Great Britain | Mar. 20, 1939 |
| 529,411 | Great Britain | Nov. 20, 1940 |